United States Patent [19]
Brennan et al.

[11] Patent Number: 5,485,771
[45] Date of Patent: Jan. 23, 1996

[54] APPARATUS FOR GENERATING OPHTHALMIC PRODUCTS FROM BLANKS AND A METHOD OF OPERATING SAME

[75] Inventors: William D. Brennan, Muskogee, Okla.; Stephen Kulan, Highland, Ind.; Ronald T. Hyslop, Tulsa, Okla.; Johnny Ellis, Broken Arrow, Okla.; Ray Gregory, Muskogee, Okla.; Larry Penner, Wagoner, Okla.; James K. Hays, Okmulgee, Okla.

[73] Assignee: Coburn Optical Industries, Inc., Muskogee, Okla.

[21] Appl. No.: 38,350

[22] Filed: Mar. 19, 1993

Related U.S. Application Data

[63] Continuation-in-part of Ser. No. 11,835, Feb. 2, 1993, abandoned, which is a continuation of Ser. No. 766,394, Sep. 27, 1991, abandoned.

[51] Int. Cl.$^6$ .................................................. B23B 5/00
[52] U.S. Cl. .................................................. 82/1.11; 82/118
[58] Field of Search ............................. 82/11, 118, 12, 82/1.11; 409/199; 51/284 R

[56] References Cited

U.S. PATENT DOCUMENTS

| | | | |
|---|---|---|---|
| 3,589,078 | 6/1971 | Bala et al. | 51/165 |
| 4,210,038 | 7/1980 | Hill | 82/11 |
| 4,493,168 | 1/1985 | Field, Jr. | 51/165.87 |
| 4,602,540 | 7/1986 | Murojashi et al. | 82/118 |
| 4,653,360 | 3/1987 | Compton | 82/118 X |
| 4,907,373 | 3/1990 | Hunter et al. | 51/58 |
| 4,989,316 | 2/1991 | Logan et al. | 409/80 X |

FOREIGN PATENT DOCUMENTS 0420244  4/1991  European Pat. Off. .

OTHER PUBLICATIONS

Tool and Manufacturing Engineers Handbook 3rd ed. McGraw-Hill Book Company, 1980 pp. 12–78.

Primary Examiner—Z. R. Bilinsky
Attorney, Agent, or Firm—Burns, Doane, Swecker & Mathis

[57] ABSTRACT

An apparatus for use in the generation of ophthalmic products from blanks comprises a mechanism for rotating the blank about an axis of rotation. A cutter tool imparts a desired surface configuration onto the rotating blank. A first moving mechanism moves the cutter tool in a first direction oriented parallel to the axis of rotation of the blank. A second moving mechanism moves the cutter tool in a second direction oriented transverse to the first axis. A digital electronic system controls the angular displacement of the blank with respect to a reference plane containing the blank, and controls the movements of the cutter tool in the first and second directions. The movements of the cutter tool in the first and second directions, and the angular displacement of the blank about the axis of rotation are all controlled independently of one another by the digital electronic system.

21 Claims, 25 Drawing Sheets

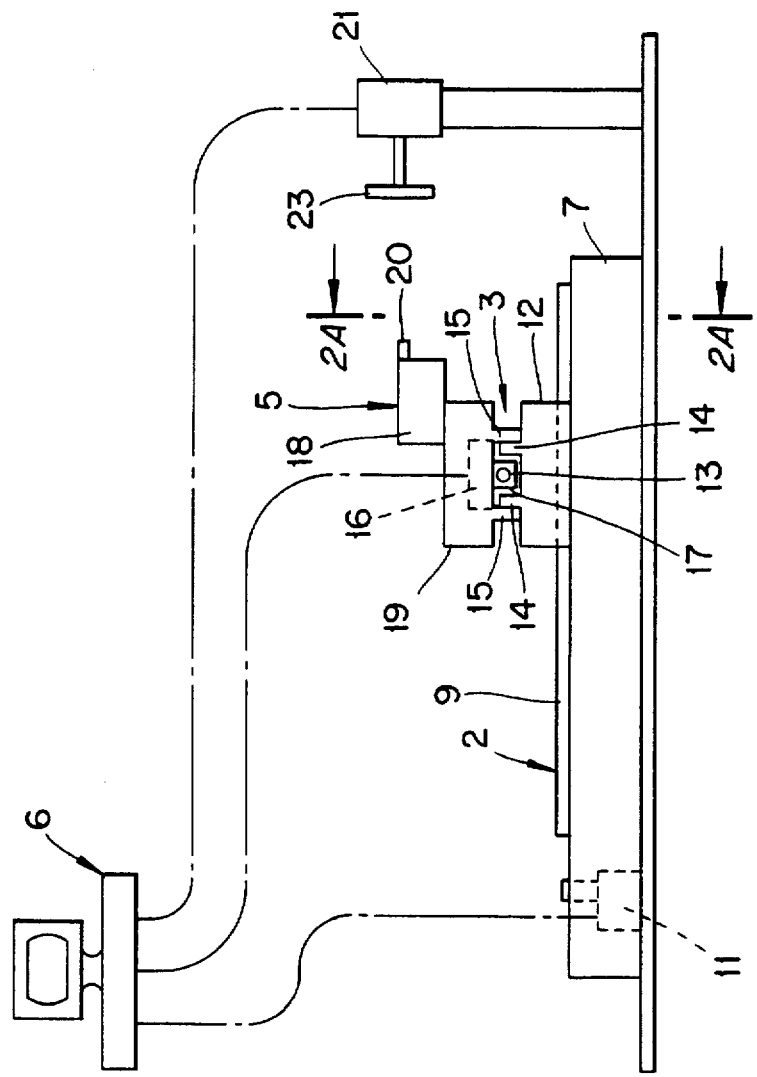
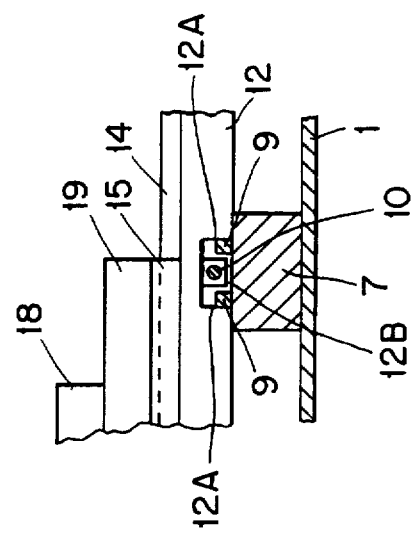

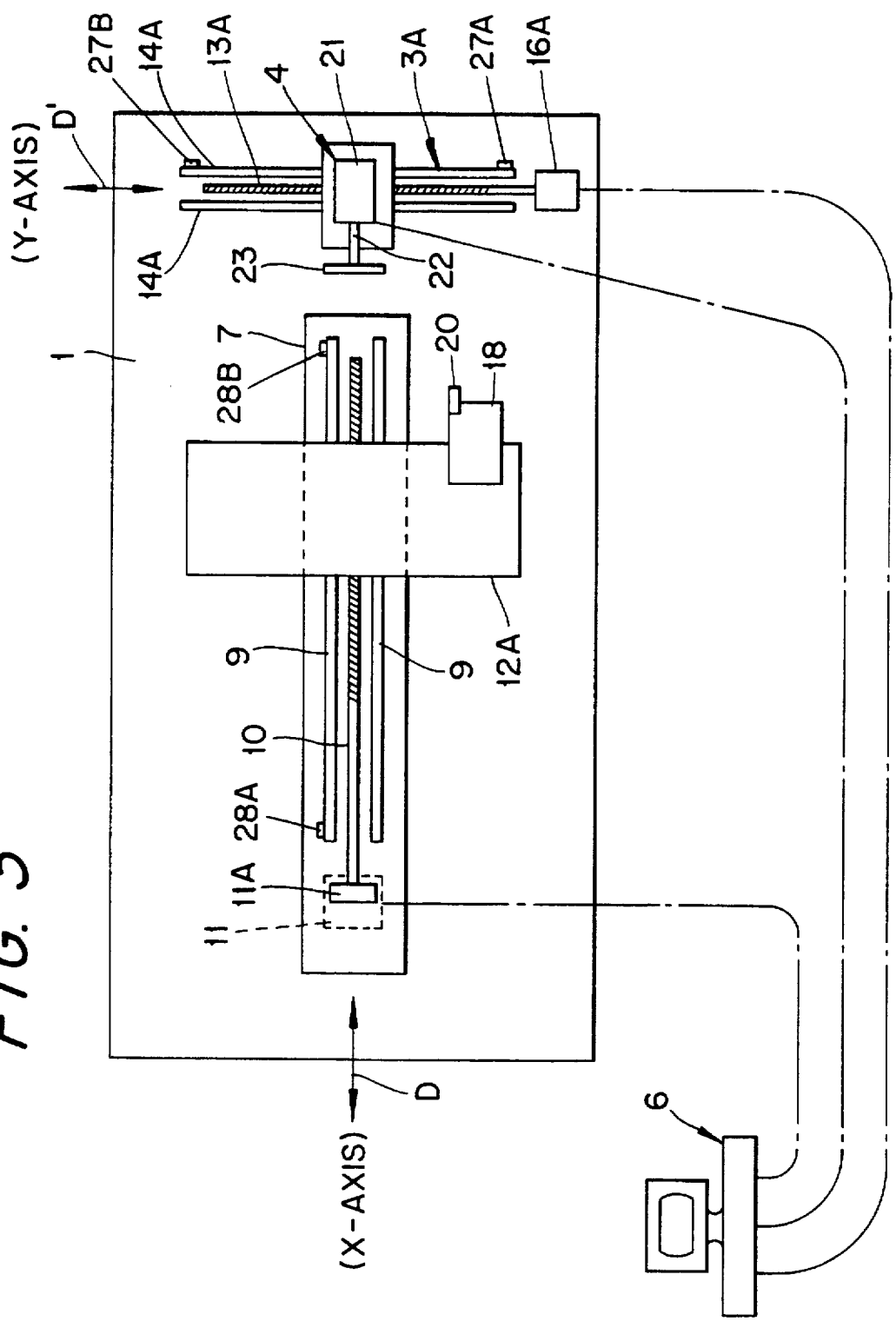

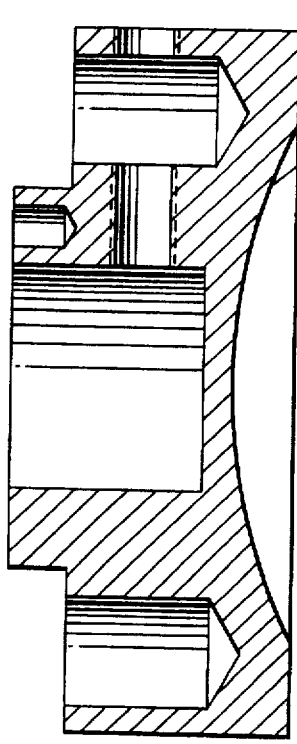
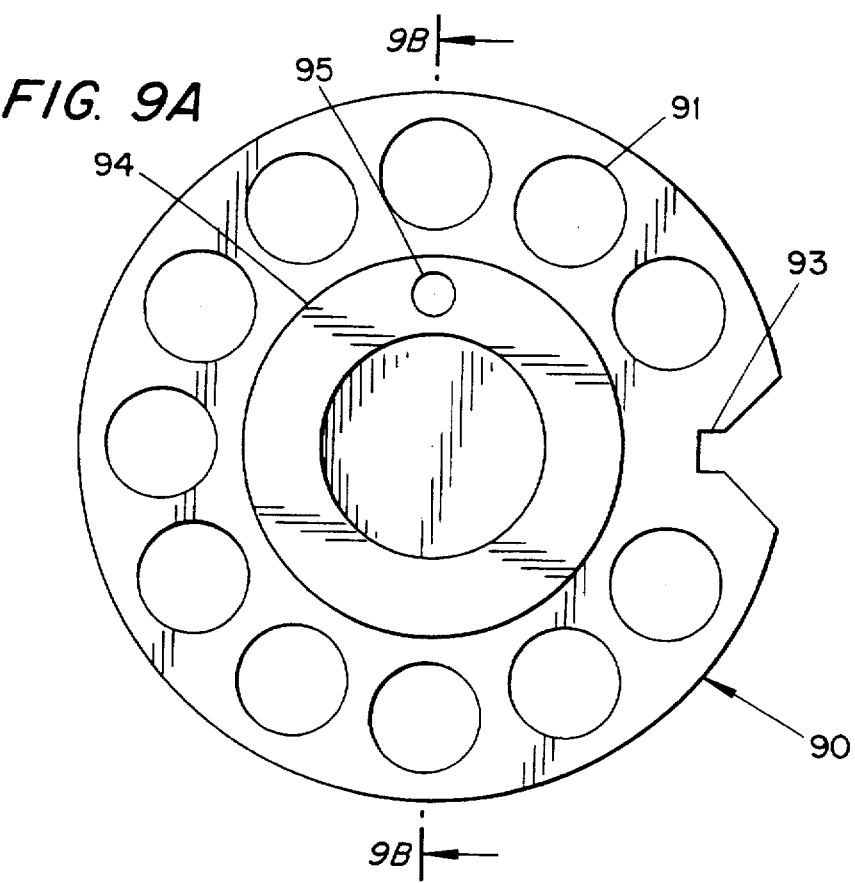
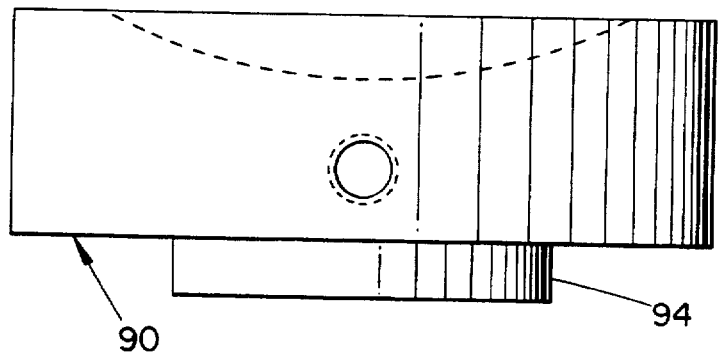

APPARATUS FOR GENERATING OPHTHALMIC PRODUCTS FROM BLANKS AND A METHOD OF OPERATING SAME

This is a continuation-in-part of U.S. patent application Ser. No. 08/011,835 filed Feb. 2, 1993 now abandoned, which is a continuation of U.S. patent application Ser. No. 07/766,394 filed Sep. 27, 1991, now abandoned.

BACKGROUND OF THE INVENTION

1. Field of the Invention

The present invention relates to an apparatus, such as a lathe, for use in the generation of ophthalmic products from blanks, and, in particular, to a apparatus for use in the generation of visual lenses, such as spectacle lenses and contact lenses, and lap tools for use in the ophthalmic industry. The invention also relates to a method of operating such a apparatus.

2. Discussion of the Related Art

U.S. Pat. No. 4,989,316 to Logan et at. discloses a machine for generating spectacle lenses and laps which may include a toric surface finish. In this particular machine the generation is achieved by means of a milling tool which acts on a rotating work-piece. The relative position of the milling cutter to the work-piece, both linearly and angularly, is controlled by a computer, where the linear position of the milling cutter is controlled along the rotational axis in response to (i) the angular position of the work-piece with respect to a reference plane, and (ii) the displacement of the cutter from the rotational axis.

The drawbacks of the above configuration of generating machine for ophthalmic products are two-fold, and as follows:

1) The finish generated on a lens by a milling cutter is coarse in nature. Consequently, extensive fining and polishing of the surface has to be employed. As will be well appreciated by those in the industry, the fining and polishing employed with visual lenses such as spectacle lenses involves a lap tool which is moved in short stroke motions across the surface being polished. No matter how good a match the surface of the lens is to the surface of the lap, a coarsely generated lens surface will take longer to fine and polish than a more finely produced surface; and 2) Where the angular displacement of the work-piece is used to drive the linear displacement/alignment of the work-piece with respect to the milling cutter, the control of the machine is necessarily time consuming and inherently prone to in-built following error. One of the reasons for this is that the speed of rotation of the work-piece and the distance from the tool to the work-piece rotational axis are independently controlled, requiting the third and final axis to be highly responsive to the variations of first two axes. A consequence of this is that the generator described is reactive and not proactive. Thus, if the independent axes are inaccurate, the third axis is required to be highly reactive to adjust for the misalignment, which might exceed the limitations of the machine.

Additionally, prior art systems have suffered from a problem of disposing of the waste material, or swarf, produced in the cutting operation. Typically, this material is removed from the location of a cutter head by a vacuum operation, other mechanical means, an operator's hand, and/or a combination of these operations. However, the swarf can be in the form of long strands of material (when not employing a milling machine such as disclosed in the Logan et al. patent), particularly when the material being cut is a polycarbonate material, which tend to clog the machinery. Of course, the employment of an operator's hand near a cutter tool creates a safety hazard.

The prior art has aim suffered from a lack of an accurate and fast calibration system. For instance, the prior art requires that the X-axis and the Y-axis movement devices be precisely orthogonal to one another. This requires that the machine be carefully designed, built and aligned to fight tolerances, requiring relatively large expenditures in time, labor and machinery. Also, each time a blank of different dimensions than the previous blank is inserted into a prior art system, the lathe has to be carefully adjusted to accommodate the new blank.

The prior art has also suffered from a lack of a quick, simple and accurate cutter height adjusting mechanism and method of determining the cutter head height alignment.

SUMMARY OF THE INVENTION

The present invention is concerned with providing an apparatus for generating visual lenses (such as contact lenses or spectacle lenses), and lap tools in which the drawbacks detailed above are overcome or alleviated.

In accordance with the present invention there is provided an apparatus for use in the generation of ophthalmic products from blanks comprising:

a) a mechanism to rotate a blank about an axis of rotation;

b) a cutter tool for imparting the desired surface configuration onto the rotating blank;

c) a first moving mechanism for effecting relative movement between the cutter tool and the blank in a first direction oriented parallel to the axis of rotation of the blank;

d) a second moving mechanism for effecting relative movement between the cutter tool and the blank in a second direction oriented transversely to the first direction; and e) a digital electronic device connected to the rotating mechanism and to the first and second moving mechanisms for supplying control signals controlling the angular displacement of the blank with respect to a reference plane containing the blank, and controlling the movement of the cutter tool in the first and second directions, such that the movements of the cutter tool in the first and second directions and the angular displacement of the blank about the axis of rotation are all controlled independently of one another by means of control signals supplied at regular time intervals.

In a preferred embodiment of the present invention, each of the means to locate and move the cutter tool along the first and second axis comprises:

i) two parallel disposed mils on a first body and two parallel disposed guides on a second body which mils and guide interact with each other to limit movement to one desired direction only;

ii) a drive shaft mounted on the first body driven by a motor to provide the drive and locating force for the second body; and iii) a drive transmission element mounted on the second body to transfer the motion from the drive shaft to the second body.

An apparatus made in accordance with the present invention will normally include a main support case upon which a majority of the working components are mounted. In accordance with one particular arrangement of the present invention, the means to locate and move the cutter tool along a first axis parallel to the axis of rotation of the blank is mounted upon the support case of the apparatus, which support case acts as the first body. The second body comprises a block located on the support case by the interaction of the rails and guides. In this embodiment, the means to locate and move the cutter tool along a second axis perpendicular to the first axis is mounted to the block, which block acts as the first body for the second location and movement means with the second body comprising the cutter tool.

Preferably, the cutter tool is normally mounted in a suitable mounting block that is located or moved by the means to locate and move the cutter tool. The mounting block includes a height adjusting device for precisely adjusting the height of the cutter relative to the rotational axis. This includes a wedge system and micro-adjustment screws for moving one wedge over another in a finely controlled fashion to adjust the relative height of the cutting tool.

A digital electronic system, such as a personal computer, is used to control the location of the cutter tool in space with respect to the angular position of the blank. The digital electronic system can be used to calculate the actual curve shapes to be generated in the blank surface from information provided thereto by the operator or a host computer. In a preferred embodiment of the present invention this will be time based point data that is calculated by the digital electronic system.

In a preferred embodiment of the present invention, the means to locate and move the cutter tool along a first axis, and the means to locate and move the cutter tool along a second axis serve to locate and move the cutter tool in directions substantially perpendicular to one another. However, the criticality of the orthogonality of the first and second axes is greatly reduced by the employment of a calibration routine in which offsets between the ideal axes positions and the actual axes positions are accommodated. The axes can be offset by a large amount without adverse results.

An apparatus made in accordance with the present invention can be used to generate a large number of so-called complex surface shapes, for example, concave, convex, symmetrical aspheric, non-symmetrical aspheric, torics, and can be used to generate simple surface configurations, for example, a spherical shape, as well as surfaces disposed at various angles to the axis of rotation (prism).

In one particular mode of operation of the apparatus made in accordance with the present invention, it is envisioned that the rate of displacement of the cutter tool along the second axis will be substantially constant with respect to the relative angular position of the blank, while the displacement of the cutter tool along the first axis will be varied accordingly to generate the desired surface. It will be well appreciated by those skilled in the art that this is only one particular way of operating the apparatus to generate a surface on a blank. In an alternative more complex procedure the rate of displacement of the cutter tool along the second axis may be varied as well, but the generation action is in one direction, in addition to the oscillatory motion of the cutter tool along the first axis.

The invention also relates to a method of operating the apparatus including probe calibration, tool calibration, a cutting operation which is proactive rather than reactive, cutter tool speed control, and time optimization based on oscillatory tool motion restraints.

BRIEF DESCRIPTION OF THE DRAWING

The invention will now be illustrated by way of written description of exemplary embodiments of an apparatus made in accordance with the present invention, as illustrated in the accompanying drawings, in which:

FIG. 2 is a schematic side view of the apparatus shown in FIG. 1 of these drawings;

FIG. 2A is a fragmentary cross-sectional view taken along the line 2A—2A in FIG. 2;

FIG. 3 is a schematic plan view of a second embodiment of an apparatus in accordance with the present invention;

FIGS. 9A, 9B and 9C are rear, side sectional and top views, respectively, of a calibration gauge in accordance with the present invention;

DETAILED DESCRIPTION OF PREFERRED EMBODIMENTS OF THE INVENTION

An apparatus made in accordance with the present invention is used for generating surface shapes from blanks, and is particularly useful in generating complex surface shapes, which extend transversely to (substantially perpendicular to) an axis of rotation of the blank.

The use of the present inventive apparatus in the generation of surfaces, for which the cleanliness and quality of the cut is highly important, has distinct advantages over the use of other tools such as milling tools. Importantly, the apparatus can be set up so that the surface cut by the apparatus may need little or no further processing before use. This is of particular advantage when generating visual lenses, as it reduces the time requirement for polishing the lens, and thereby minimizes any errors and cost resulting from the polishing of the lens in a lapping machine.

Figure 10:
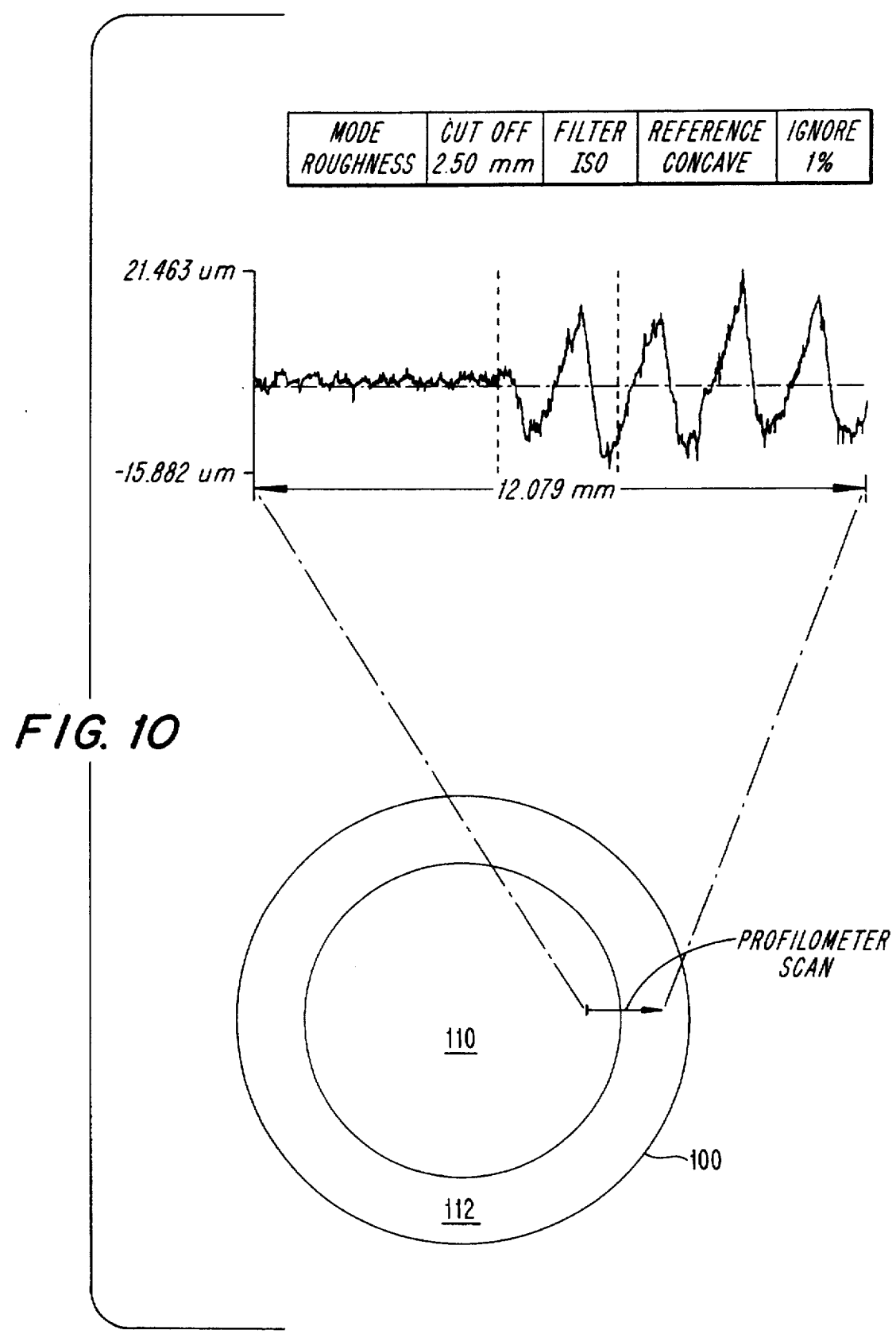
FIG. 10 is a top view of a composite lens in which the inside portion is cut using the present invention and the outside portion is cut using a prior art method and apparatus, and a corresponding graph illustrating the profile roughness of the composite lens.

FIG. 10 illustrates the dramatic difference in terms of roughness of a lens surface between a product of the present invention and a product of the prior art. A lens 100 was initially cut according to a prior art method, such as disclosed in the U.S. Pat. No. 4,989,316 to Logan et al. A lens surface 110 of smaller radius was then cut according to the present invention. Thus, the prior art method and apparatus was used to provide the outer surface 112, whereas the present invention was used to cut the inner surface 110. A profilometer scan of a few millimeters at the junction of these two surface profiles produced the graph of FIG. 10 indicating the surface roughness of the lens 100. As readily seen from the graph of FIG. 10, the surface produced by the present invention is dramatically smoother than the surface produced by the prior art method.

1) First Embodiment

Figure 1:
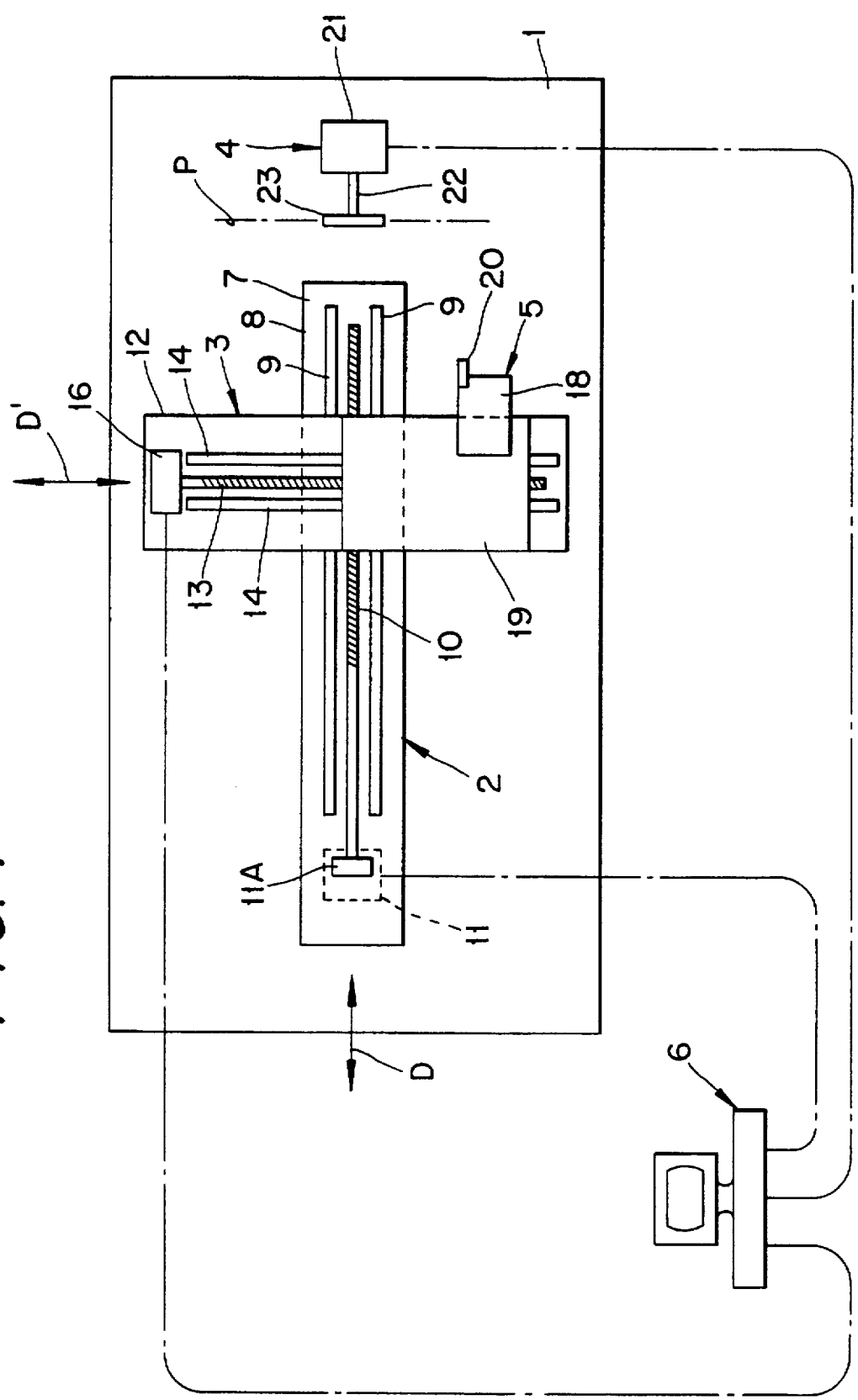
FIG. 1 is a schematic plan view of a first embodiment of an apparatus in accordance with the present invention.

FIGS. 1 and 2 of the accompanying drawings are schematic representations of an apparatus made in accordance with the present invention.

The apparatus described can advantageously cut complex surfaces, such as aspheric and toric shaped surfaces on surfaces rotating in a plane oriented transversely to the axis of rotation of a blank/work-piece. The apparatus is mounted on a support base, aim known as a stage platform 1, and comprises:

a) a first location and movement arrangement or X-axis slide 2;

b) a second location and movement arrangement or Y-axis slide 3 allowing movement in a direction (along the Y-axis) oriented transverse to the direction (X-axis) allowed by the first location and movement arrangement 2;

c) a work-piece or blank mounting arrangement 4, also called a spindle mount and chuck;

d) a cutting tool mount 5; and e) a digital electronic system or computer 6 which controls the movements of the X-axis slide 2 and the Y-axis slide 3, as well as the rotation (A-axis) of the work-piece.

It should be noted that the arbitrary labels X-axis, Y-axis and A-axis are used herein to concisely identify movement, or devices associated with movement, in a direction parallel to the axis of rotation, perpendicular to the axis of rotation and about the axis of rotation, respectively.

The first location and movement arrangement or X-slide 2 includes:

i) a support 7 having a substantially flat upper surface 8, which support 7 is affixed to the support base 1;

ii) two parallel rails 9 mounted on the upper surface 8 of the support 7 so as to allow movement in one predetermined direction;

iii) a screw threaded drive shaft 10 mounted between, and parallel with, the two mounted rails 9;

iv) a driver motor 11, which preferably includes a polyphase drive motor with a resolver for determining the speed of oscillation, of interest in connection with FIG. 15 discussed below, mounted below the surface 8 and drivingly connected to the screw threaded drive shaft 10, optionally by a transmission shaft 11A; and v) a block 12 which includes a pair of parallel guide channels 12A through which the rails 9 pass (see FIG. 2A) and a threaded member 12B with which the drive shaft 10 is threadedly connected such that rotation of the shaft 10 produces movement of the block means 12 in a first direction D (X-axis) toward and away from the mounting arrangement 4.

The screw threaded drive shaft 10 may be provided with a close pitch screw thread in order to provide high accuracy in the positioning of the means moved by the first movement arrangement. The screw pitch is chosen to optimize the ratio of linear inertia to rotational inertia. Alternatively, a hydraulic cylinder, linear motor, voice coil motor or other form of linear actuator could be used.

The second location and movement arrangement, or Y-slide 3 includes:

i) the block means 12;

ii) a positioning member 19;

iii) two parallel mounted guides 15 affixed to the lower surface of the positioning member 19 (see FIG. 2) and are positioned so as to engage with two parallel rails 14 mounted on a top surface of the block means 12;

iv) a screw threaded drive engaging means 17 provided on the lower surface of the positioning member 19, which drive engaging means 17 engages with a screw threaded shaft 13 mounted on the block means 12 parallel to the rails 14; and v) a driver motor 16, which may include a polyphase drive motor with an incremental encoder for speed control, drivingly connected to the second screw threaded drive shaft 13.

The screw shaft 13 and rails 14, 15 are oriented perpendicular to the screw shaft 10 and rails 9, so that actuation of the motor 16 causes the positioning member 19 to be displaced in a second direction D' (Y-axis) perpendicularly to the first direction D (X-axis).

The cutter tool mounting means 5 comprises a tool block 18 secured to the upper surface of the positioning member 19, and which carries an apparatus cutter tool 20. S Preferably, the cutter tool 20 employed is a cutter tool that provides a single point curing contact with the blank. Most preferably, the cutter tool 20 is a diamond type cutter tool which can be rotated within its mount to present the blank with a clean, sharp edge thereby prolonging the cutter tool's life.

The work-piece mounting arrangement 4 includes workpiece carrying chuck 23 which is similar to or the same as that commonly provided in the industry. A driver motor 21, preferably with an encoder and a brake, turns a spindle 22 that carries the chuck 23 and is mounted at the appropriate height so that when lathing or generation is underway the blank/work-piece engages with the apparatus cutter tool 20 under the control of the digital electronic system 6. The height of cutter tool 20 is adjusted to the apparatus in a fashion more fully explained below in connection with FIG. 7.

The overall operational control of the apparatus is effected by means of a digital electronic system 6, such as a programmable computer. The computer may be a dedicated, stand alone personal computer, and may be advantageously connected to a host computer (not shown). The digital electronic system 6 is connected to the driver motors 11, 16 and 21, and acts to control the position of the block means 12 on the fixed rails 9 as well to control the position of the positioning member 19 on the fixed rails 14 of the block means 12 by controlling the drives to the respective screw threaded shafts 10, 13. The digital electronic system 6 also regulates the rotation of the spindle 22 to control the angular position of the work-piece/blank being operated upon by the apparatus, with reference to a defined plane P defined by the blank/work-piece. Details of this control are provided below in connection with the descriptions of FIGS. 12–14.

It will be appreciated by those skilled in the art that the action of the two arrangements 2, 3 of parallel mounted rails and parallel mounted guides interacting with each other in transverse (perpendicular) directions so that the apparatus cutter tool 20 can be located anywhere in a certain three dimensional space defined by the apparatus.

2) Second Embodiment

Figure 4:
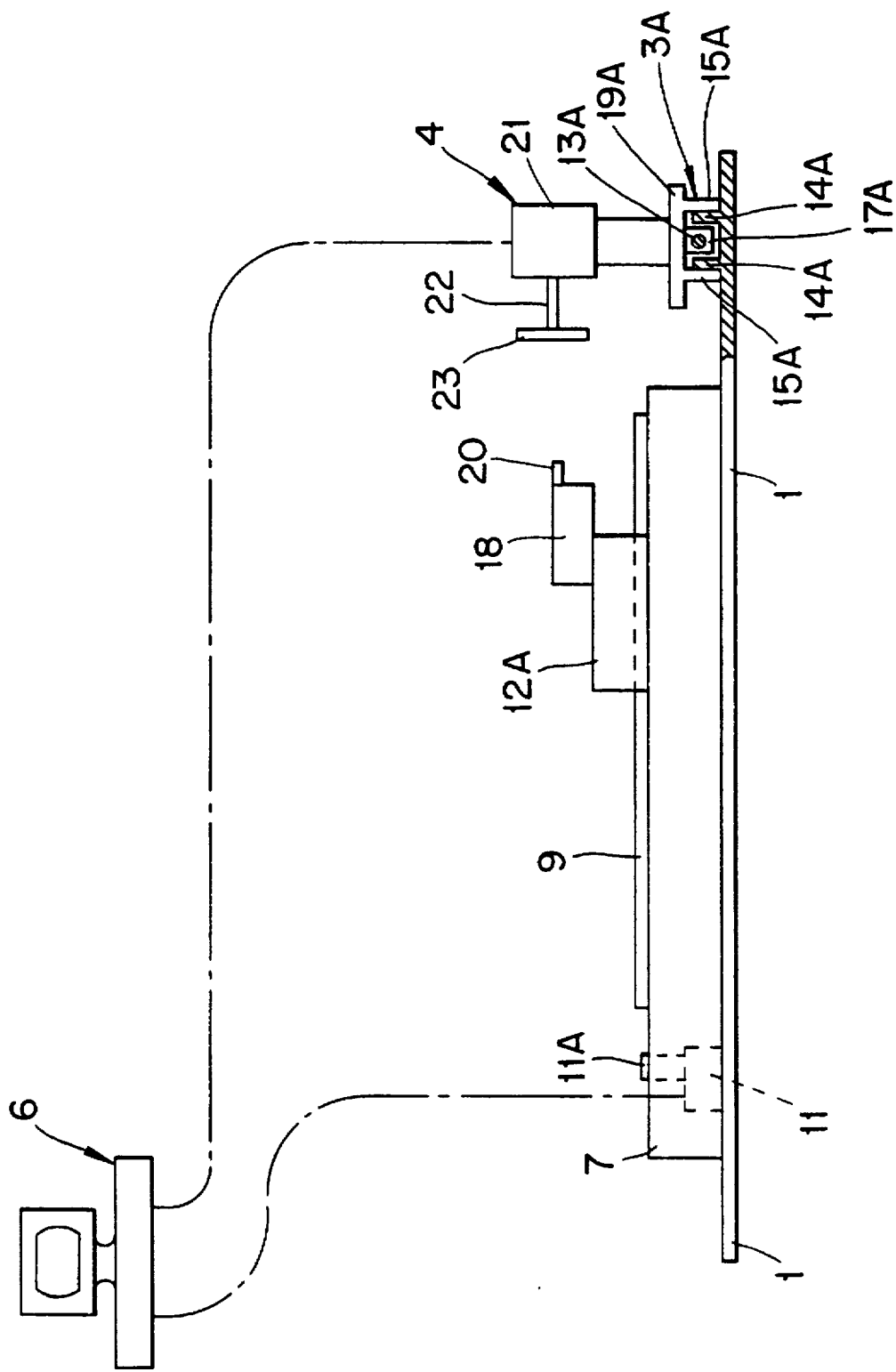
FIG. 4 is a schematic side view of the apparatus shown in FIG. 3 of the drawings, with a portion thereof broken away.
Figure 5:
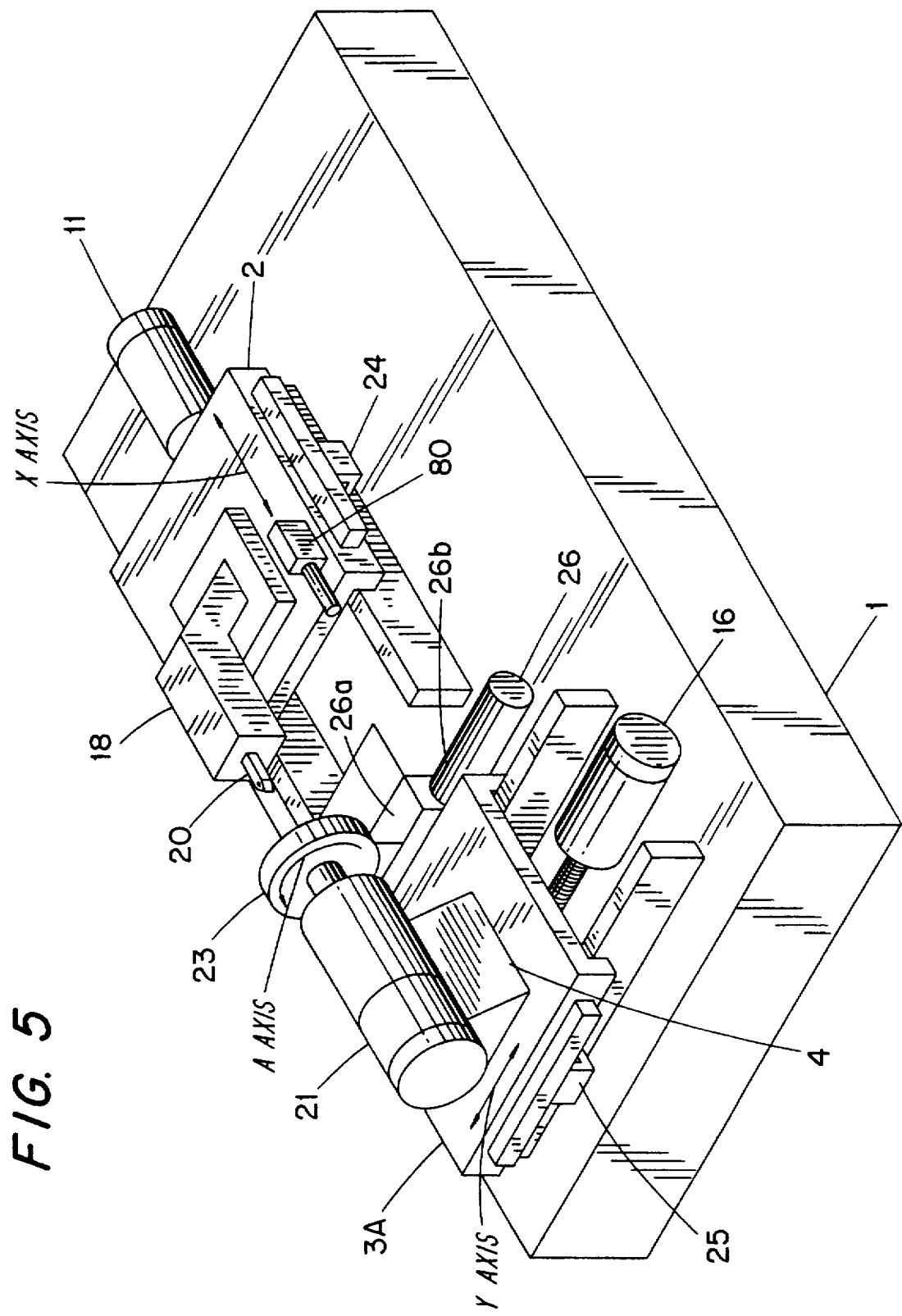
FIG. 5 is a perspective view of the embodiment shown in FIG. 3, with the position of several encoders included.

FIGS. 3, 4 and 5 of the accompanying drawings show a second embodiment of an apparatus in accordance with the present invention. This second example of an apparatus is very similar to that shown in FIGS. 1 and 2 of the accompanying drawings and for this reason corresponding numerals have been used to indicate like components.

The apparatus shown in FIGS. 3, 4 and 5 of the accompanying drawings differs from that shown in FIGS. 1 and 2 with respect to the means used to locate and move the cutter tool with respect to the blank/work-piece. In particular, the second location and movement arrangement or Y-axis slide 3A (which allows movement in a direction transverse to the direction allowed by the X-axis slide and transverse to the axis of rotation of the work-piece/blank) differs from that in FIGS. 1 and 2.

In this particular example of an apparatus made in accordance with the present invention the second location and movement arrangement or Y-axis axis slide 3A comprises two parallel rails 14A mounted on the support base 1 and two parallel guides 15A mounted on a block member 19A.

The work-piece or blank mounting arrangement 4 is located on the block member 19A. Consequently, in operation, the block means 12A and the cutter tool are moved in a direction D (X-axis) parallel to the axis of rotation of the blank/work-piece with respect to the support base 1, and the blank/work-piece is moved in a direction transverse D' (Y-axis) substantially perpendicular to the axis of rotation of the blank/work-piece with respect to the support base 1. The second embodiment is advantageous over the first in that the blank mounting arrangement 4 can be moved away from the cutter tool to allow greater access in a rotational axis direction by an operator to, for example, change work-pieces.

Though not shown in the drawings, the entire apparatus is preferably placed in a housing including a window laterally spaced from the cutter tool. The blank mounting arrangement 4 can then be shifted toward the window in a "++ Y-axis direction, for example, so that an operator can safely work with the chuck 23.

FIG. 3 also indicates the position of a (+) Y-axis limit switch 27A, a (−) Y-axis limit switch 27B, a (+) X-axis limit switch 28A, and a (−) X-axis limit switch 28B at the respective limits of travel of the block 12A and the work-piece mounting arrangement 4 in the X-axis and Y-axis directions. These switches 27A, 27B, 28A, and 28B provide a signal when the block 12A or work-piece mounting arrangement 4 reaches a respective limit of travel. The signals are used by the computer 6 as described below in connection with FIGS. 12–14. Similar switches may advantageously appear similarly in the first embodiment.

FIG. 5 is a perspective view of the second embodiment of the present invention. This embodiment better illustrates the position of encoders 24 and 25 along the X-axis and Y-axis, as well as the rotational encoder in spindle motor 21. These encoders can be in the form of any acceptable encoders or resolvers with sufficient resolution. The encoders 24 and 25 are positioned on the respective X- and Y-slides 2 and 3A so that, even if the slide mechanisms are subject to wear, the encoders 24 and 25 will continue to accurately encode the positional relationship of the individual slides 2 and 3A.

FIG. 5 also illustrates a portion of a vacuum chip disposal conduit 26 including a channel 26b formed immediately below the chuck 23 connected to a hose or tube 26a. The vacuum chip disposal conduit 26 can be employed in the embodiment of FIG. 1 in a similar fashion, or in other cutter apparatuses which generate swarf.

To facilitate swarf removal, the cutting tool 20 is positioned upside down so that the swarf is generated in a downward direction. Swarf generated by the interaction of the single point diamond cutting tool 20 and a lens blank 23 may take the form of long strings of material. The swarf then enters the channel 26b and onto a tube 26a which is operatively connected to a vacuum system (not shown).

Though not illustrated in the drawings, to increase the efficiency of the vacuum, a box like structure with a hinged wall surrounds the cutter tool 20 and work-piece in its cutting position. The hinged wall is spring-loaded to move out of the way when the Y-axis slide 3A moves away from the cutter tool 20 in a Y-axis direction for operator interaction with the chuck 23, but springs back in place when the Y-axis slide 3A is in the cutting position.

3) Swarf Cutter

Figure 6:
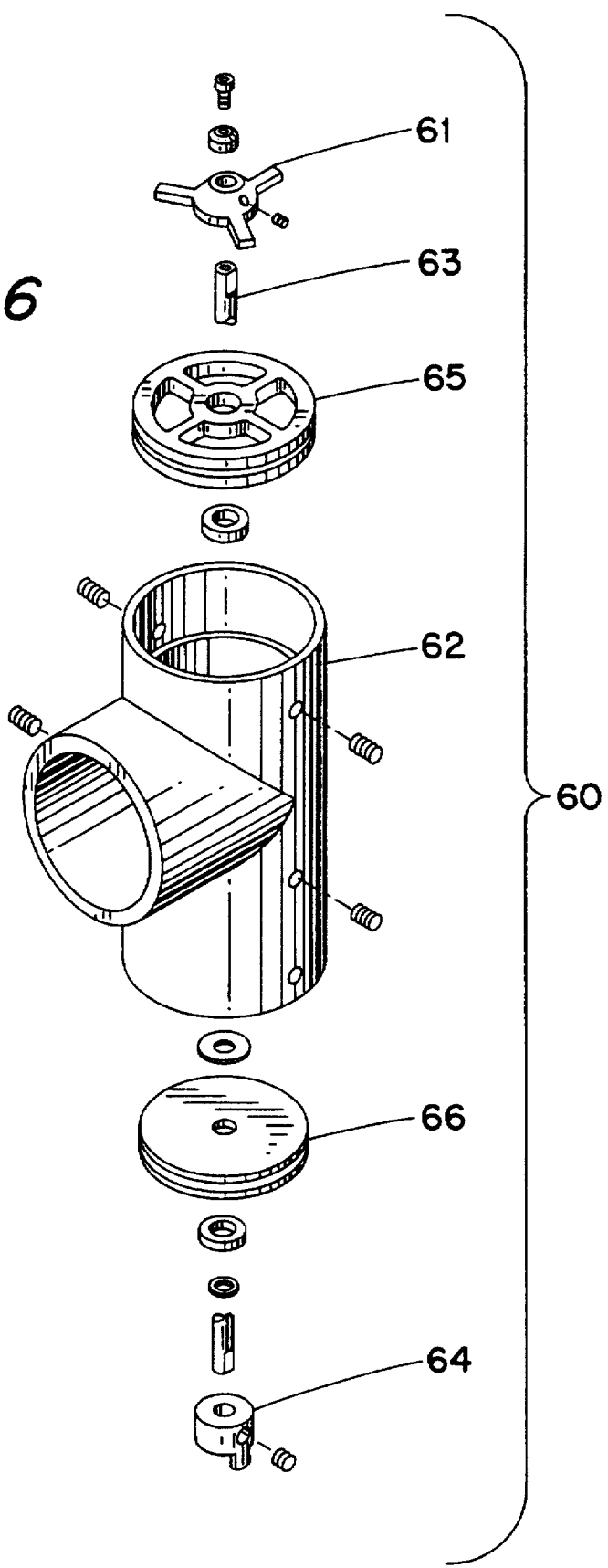
FIG. 6 is an exploded view of a swarf cutter section of a swarf removal system in accordance with the present invention.

Interposed between the tube 26a and the vacuum system (not shown) is a swarf cutter section 60 shown in FIG. 6. In FIG. 6, a swarf cutter 61 is positioned in a sealed housing tee 62 to maximize vacuum pressure generated by a vacuum system. The cutter 61 may be in the form of three radially disposed blades mounted to a drive shaft. The drive shaft 63 is driven by a motor (not shown) via a socket 64. The radial blades of the swarf cutter 61 interact with a cutter plate 65 such that long strands of swarf are not twisted when being cut. Rather, the swarf is cut in a scissor-like action as it passes between the apertures appearing in these cutter plate 65 and the swarf cutter 61 passes closely adjacent to the rims of the cutter plate 65. The size of the swarf pieces thus generated is governed by the speed of the swarf cutter 61 and the vacuum pressure of the vacuum system.

The bottom of the tee 62 is sealed with a bearing block 66 and miscellaneous bearings, screws, washers and end caps are used, as needed, to stabilize and position the swarf cutter within its housing, such as shown in FIG. 6. A vacuum system is connectable to the stem portion of the tee 62. The vacuum system may be in the form of an individual canister-type vacuum dedicated to the individual lens cutting apparatus, or may be in the form of a centralized vacuum system when, for instance, more than one lens cutting apparatus is in a given location or plant.

4) Cutter Tool Height Micro-Adjustment

Figure 7:
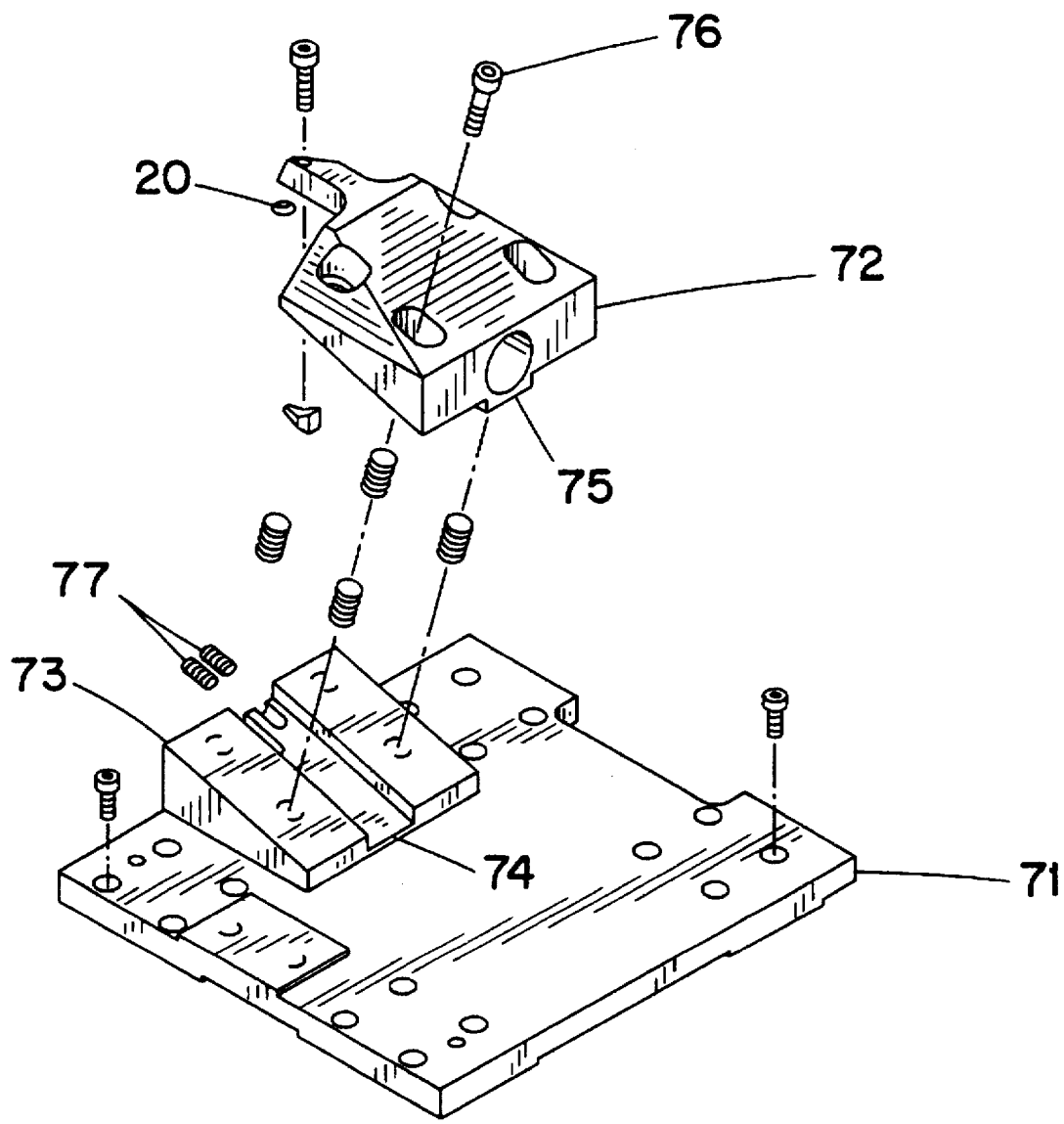
FIG. 7 is an exploded view of the cutter mount block detailing a height adjustment mechanism in accordance with the present invention.

FIG. 7 illustrates a portion of the cutter tool holder 18 including detail as to a cutter tool holder height adjusting mechanism of the cutter tool holder 18. The cutter tool holder 18 and includes a base 71 on which a first wedge 73 is formed. The first wedge 73 has a surface the plane of which intersects the plane of the base 71 at an angle. A slot 74 is formed in the upper surface of the first wedge 73. The cutter tool holder 18 also includes a second wedge portion 72. The second wedge portion 72 includes a rib 75 which is placed within slot 74 in its operative position to align the cutter tool 20 to the tool holder 18.

Four cap screws 76 connect the upper wedge 72 to the lower wedge 73 in a locking fashion. The threaded screws 76 seat in slotted apertures in the second wedge portion 72 and are threaded into threaded apertures appearing in the first, lower wedge portion 73.

Between the two wedge portions 72 and 73 are placed two adjustment or set screws 77 the axes of which are parallel to the plane formed by the intersecting wedge faces of the first and second wedges 72 and 73. The cutter tool height is adjusted by loosening the four cap screws 76 on top of the second, upper wedge 72. The four cap screws 76 are left slightly snug. Thereafter, either one or the other set screw 77 is rotated to either raise or lower the cutter tool height. There are two set screws in order to provide a locking mechanism on the adjustment, in addition to the tightening of the four cap screws 76. To raise the cutter tool height, the upper wedge 72 is slid across the lower wedge 73 in a forward direction, toward the cutter tool 20 by rotating one set screw.

To lower the cutter tool height, the upper wedge 72 is slid across the lower wedge 73 in a backward direction, away from the cutter tool 20 by rotating the other set screw. To secure the adjustment, the set screw not used in the adjustment is tightened, thus creating a lock.

The set screws 77 provide a micro-adjustment mechanism by translating small rotations of the set screws into even smaller height adjustments.

5) Sensor Probe

Figure 8:
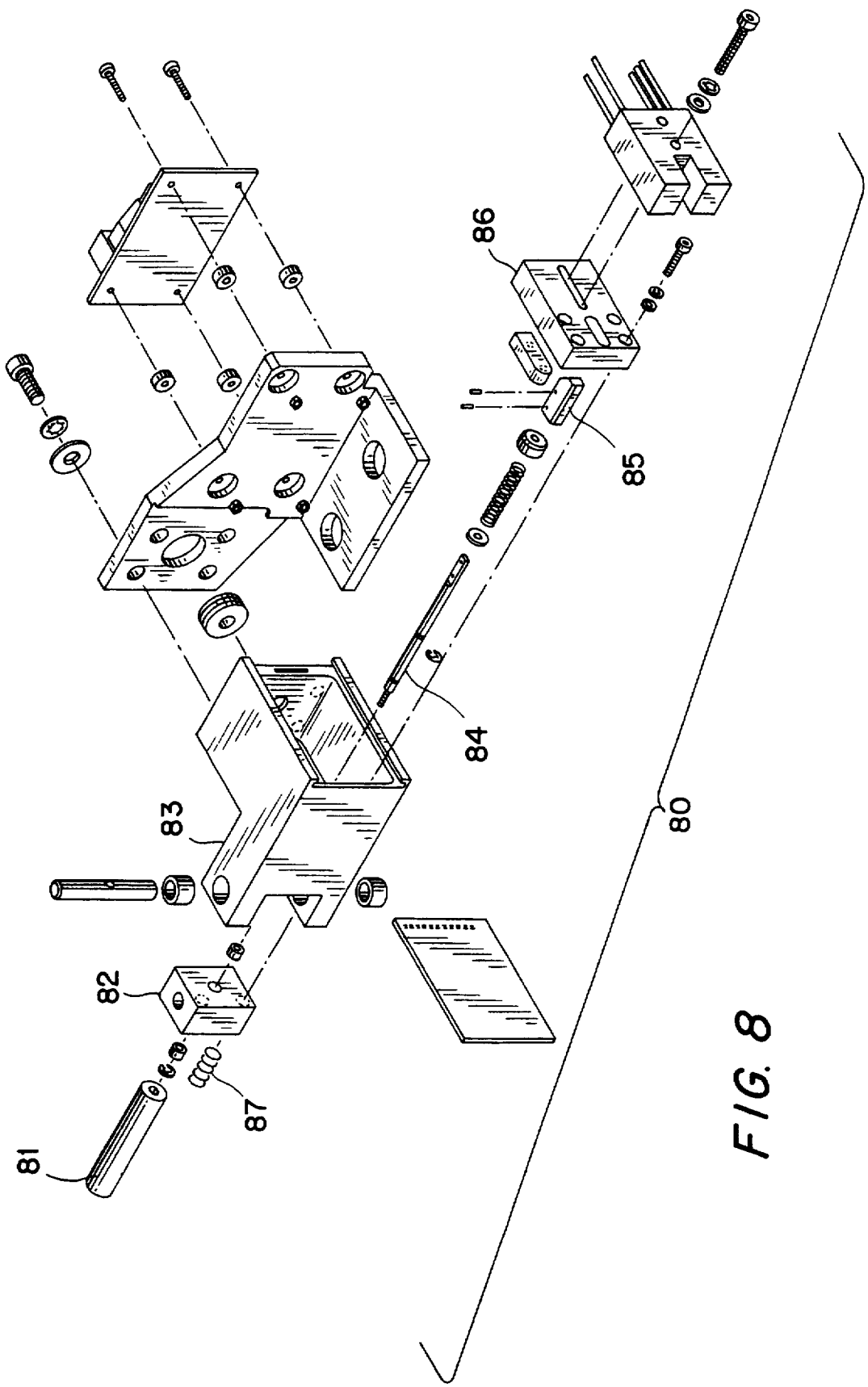
FIG. 8 is an exploded view of a sensor probe and probe housing in accordance with the present invention.

FIG. 8 illustrates the probe 80 and probe housing of the present invention. The probe 80 includes a probe tip or stinger 81 which is mounted to a probe pivot block 82. The probe pivot block 82 is mounted via probe pivot pin to a probe housing 83. Connected to the other end of the probe pivot block 82 is probe shaft 84 to which a probe shaft end shroud or shutter 85 is mounted. The shutter 85 interacts with a probe switch 86. The probe switch 86 may be, for example, an optical device which precisely focuses an infrared beam of light to a point closely adjacent to a diagonal edge of the shutter 85 in its normal position when the probe tip 81 is not displaced by an object. When the shutter 85 is moved to one side, the optical switch 86 is triggered. Additionally with the aid of a spring 87, the probe shaft 84 is permitted to translate axially so that when the tip 81 of the probe 80 is touched in an axial direction, the probe switch 86 is triggered. Thus, the probe 80 shown in FIG. 8 can be triggered by movements in two directions.

6) Calibration Gauge

FIGS. 9A, 9B and 9C illustrate a calibration gauge 90 in accordance with the present invention. The calibration gauge 90 is a cylinder into which a series of bores 91 are cut into a back face thereof. The bores 91 lighten the gauge 90 and thereby reduce its inertia. A face surface includes a spherical, concave surface 92 and the peripheral edge of the gauge 90 includes a notch 93. The notch 93 is formed by cutting a V-shape into the edge surface of the gauge 90, the function of which is explained below in connection with FIGS. 12 and 13. The rear surface projection 94 of the gauge 90 is insertable into the chuck 23. In that connection, an indexing bore 95 is provided in the surface projection 94 insertable into the chuck 23. This indexing bore 95 engages an indexing pin of the chuck 23 for accurate angular alignment of the gauge 90 relative to the chuck 23 for the calibration process involving the notch 93, explained below in connection with FIG. 13a.

Specific dimensions and angles are not critical to the invention and, in the preferred embodiment, the V shaped notch includes a parallel walled channel dimension smaller than the tip 81 of the probe shown in FIG. 8. However, relatively tight tolerances are placed on the gauge dimensions.

The precision calibration gauge 90 is used as a removable block to establish physical parameters of the system, used in conjunction with the sensing probe 80. The calibration gauge 90 is used to establish the relationship of the X- and Y-axes as to the degree of orthogonality (it is important to note that the system will function without precise orthogonality as opposed to other, conventional systems), and determining any offset therebetween. The calibration gauge is also used to establish the displacement of the rotational axis from the X-axis and determining the magnitude thereof, and to establish a reference plane with reference to the perpendicular rotational axes, and to establish a point on the curved part of the calibration gauge 90 to set a reference point for center thickness integrity of a cut lens. The V-notch in the perimeter of the calibration gauge 90 is used for establishing a reference point for the angular disposition of the lens to be cut. The manner in which this is done is explained below with reference to FIGS. 12–14.

7) Probe Calibration

Figure 12A:
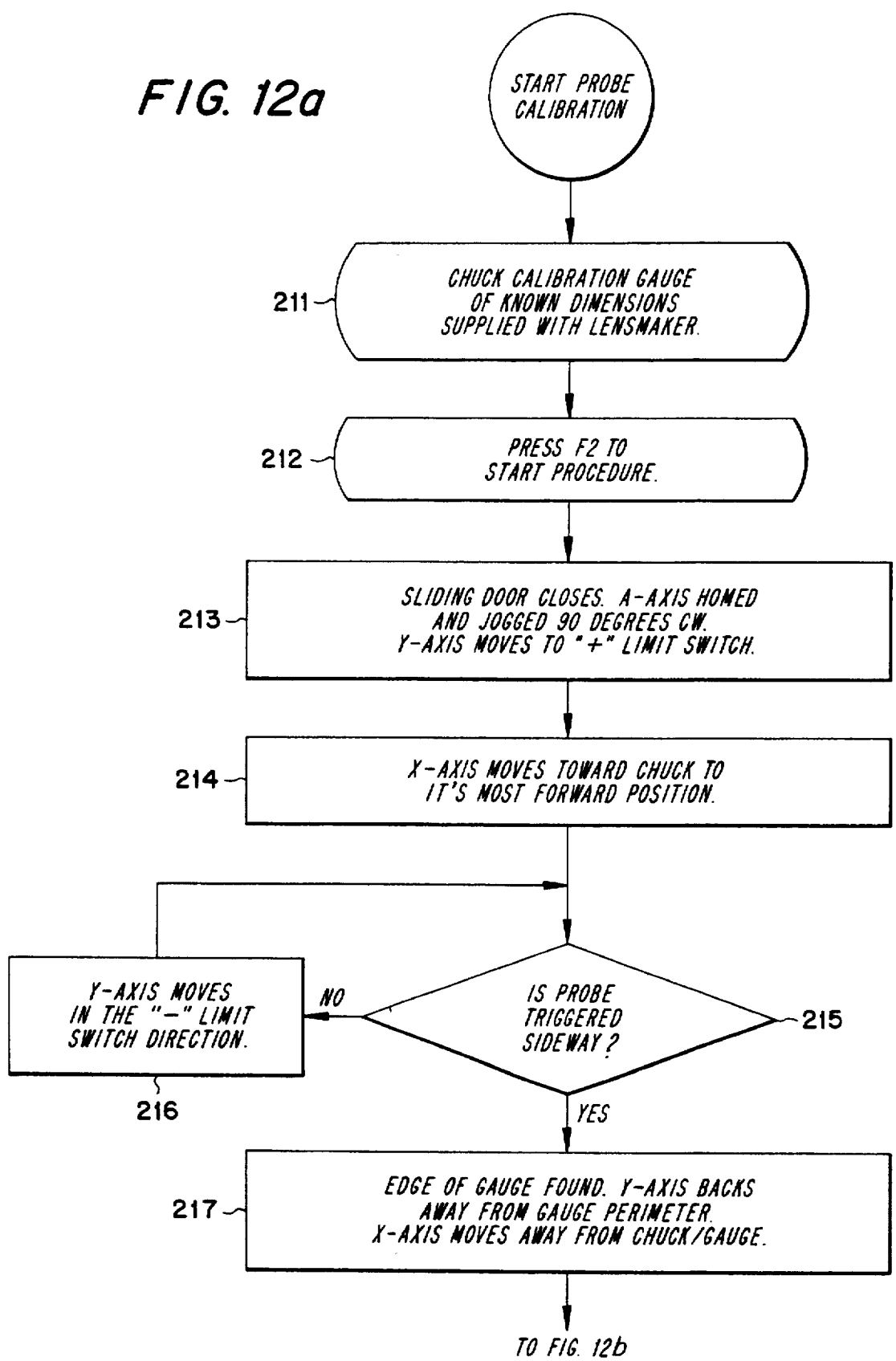
FIG. 12a–12c form in a flow chart of a probe calibration method in accordance with the present invention.
Figure 12B:
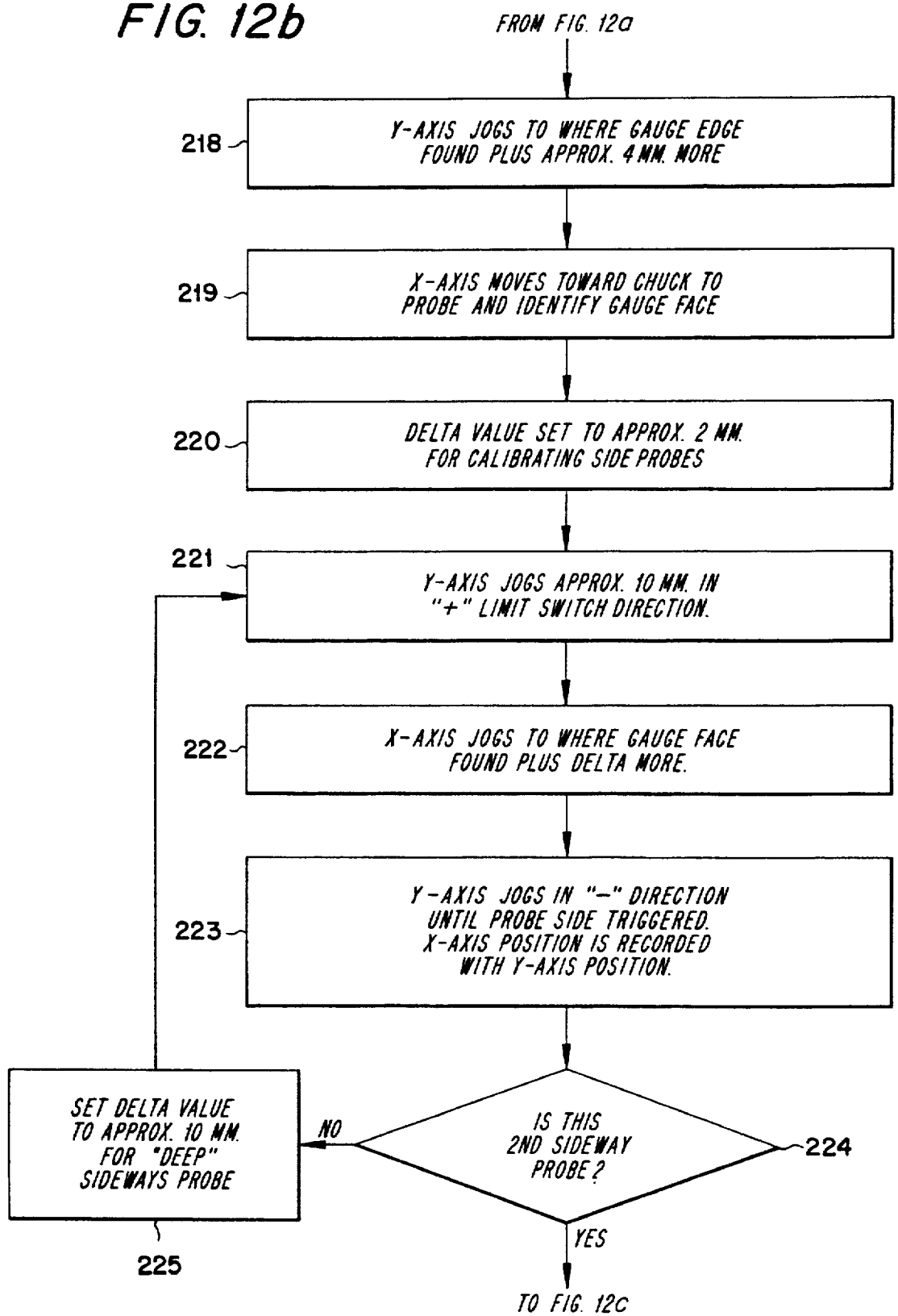
Figure 12C:
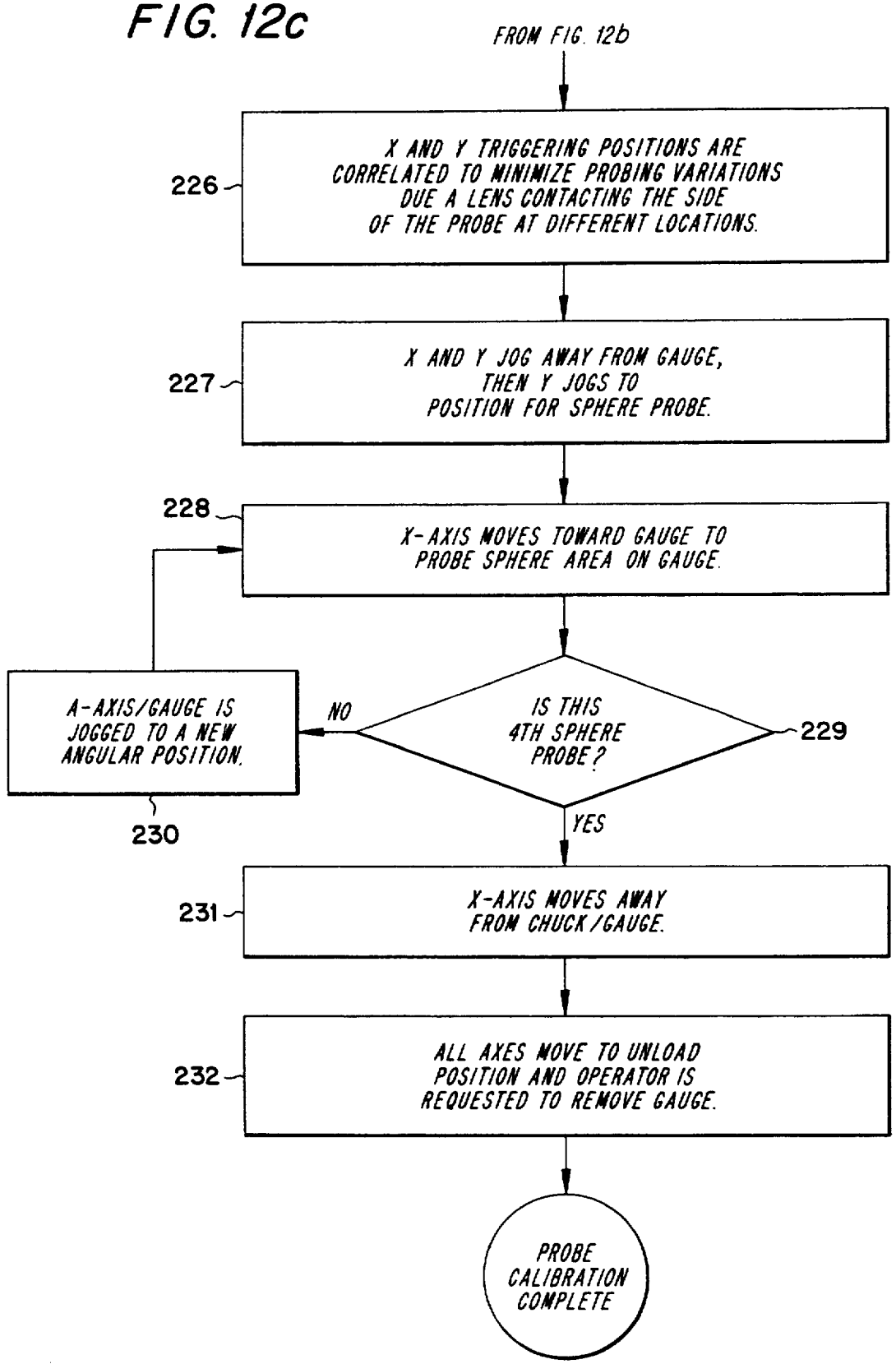

FIG. 12a–12c illustrates the basic concepts of the probe calibration are shown in FIG. 8. This is necessary so that the apparatus is calibrated to the specific probe 80 placed therein because each individual probe may be slightly different within manufacturing tolerances. Probe calibration is done in conjunction with the calibration gauge 90 illustrated in FIG. 9.

At step 211, calibration gauge 90 placed into the chuck 23. The calibration gauge 90 is of known dimensions and may be supplied with the apparatus. At step 212, a dedicated control function key (F2) is pressed to begin the procedure. At step 213 the sliding door (not shown) of the apparatus closes and the rotational axis (A-axis) is moved to a home position and then rotated 90° clockwise. The Y-axis slide 3A moves to a "plus" limit switch 27A. Limit switches 27A, 27B, 28A, 28B are positioned at the extreme positions on the X-axis slide 2 and Y-axis slide 3A and triggered when the slides reach the extreme positions, as explained above with reference to FIG. 3.

At step 214, the X-axis slide 2 moves towards the chuck 23 in its most forward position. At step 215, it is determined whether the probe 80 is triggered by a sideways motion. If not, the procedure continues on to step 216 where the Y-axis slide 3A moves in the "−" limit switch direction. This cycle continues until the probe 80 is triggered sideways, as detected at step 215. At step 217, the edge of the gauge 90 is determined to have been found. The Y-axis slide 3A backs away from the gauge perimeter and the X-axis slide 2 moves away from the calibration gauge 90. At step 218, the Y-axis slide 3A moves to where the gauge edge was found plus an additional approximately 4 mm.

At step 219, the X-axis slide 2 moves towards the chuck 23 to probe and identify the gauge face. At step 220, a Delta value is set to approximately 2 mm so that the probe 80 will be moved beyond the face of the gauge 90. At step 221, the Y-axis slide 3A moves approximately 10 mm in the "+" limit switch direction. Thereafter at step 222, the X-axis slide 2 moves to where the gauge face is found, plus an additional distance Delta. At step 223, the Y-axis slide 3A moves in the "−" direction until the probe tip's side triggers the optical switch 86 whereupon the X-axis slide 2 position is recorded along with the Y-axis slide 3A position. In step 224, it is determined whether this is the second sideways, deep probe. If it is not, the set Delta value is changed to approximately 10 mm for "deep" sideways probing at step 225 whereupon the process returns to step 221 so that the two axially displaced positions on the probe tip 81 touches the gauge 90, thereby identifying the offset created by the pivoting of the probe 80.

If it is the second sideways probe, the process continues on to step 226 where the Y and X triggering positions are correlated to minimize probe variations due to a lens contacting of the side of the probe 80 at different locations. The apparatus thus compensates for the manufacturing variances of the probe 80.

The X and Y slides 2 and 3A move away from the gauge 90, and the Y-axis slide 3A moves to a position for spherical probing at step 227. At step 228, the X-axis slide 2 moves towards the gauge 90 to probe the spherical area 92 on the gauge. At step 229, it is determined whether this is the fourth sphere probing. If it is not, the A-axis is rotated to a new angular position at step 230 and the system returns to step 228. If four sphere probings have taken place, the process continues on to step 231 where the X-axis slide 2 moves away from the gauge 90. At step 232, the slides 2, 3A move to an unload position and the operator is requested to remove the gauge 90. The probe calibration routine is thus completed.

8) Tool Calibration

In conventional mechanical X-Y motions, the integrity of the system relies on the perpendicularity of the two axes. In the present system, the disposition of the axes are not required to be orthogonal, though this may exist. That is, the disposition may be any reasonable transversal. During an initial or periodic calibration phase, any departure from perpendicularity of the axes is sensed by the two-axis probe 80 in conjunction with the calibration gauge 90 so that correction signals or offsets (a.k.a. spatial correction coefficient(s)) are used to adjust the mechanical departure between actual and ideal axial alignment. This can reduce the high cost of precision manufacture that would be necessary in the converse case. Even when high precision is used in manufacturing conventional systems, a great deal of time is accrued to fine-tuning or zeroing-in mechanical mergence of multiple axes of motion to maintain optical integrity. This is avoided in the present invention.

For purposes of illustration, inches will be used to describe how a spatial correction offset is determined. When an angular disparity between the movement along an actual Y-axis slide 3A and the ideal Y-axis, e.g., a 12 degree error, then the X-offset is (for one inch of travel), $$1"Sin(12°)=0.2079",$$

and the Y-offset is, $$1"-(1"Cos(12°))=0.0219".$$

Then the spatial correction offset KY for any travel in the Y-direction is, $$KY=Y-(YCos(ang.error)),$$

and spatial correction offset KX for any travel in the X-direction is $$KX=-YSin(ang.error).$$

For example, if there is zero disparity between Y-ideal and Y-actual, then, KY=Y-Y(Cos(0°))=Y-Y(1)=0 and, KX=-YSin(0°)= -Y(0)=0.

A spatial correction offset for movement in the X-direction is determined similarly, except that the complimentary angle is used for finding the spatial offsets.

During the calibration mode, all of the measured parameters are permanently stored. (During set-up for cutting a lens described below, the data for the measured lens parameters are stored temporarily, since each blocked lens represents an entirely new set of parameters.) The calibration sequence is also performed periodically to establish the integrity of the system parameters.

Figure 13:
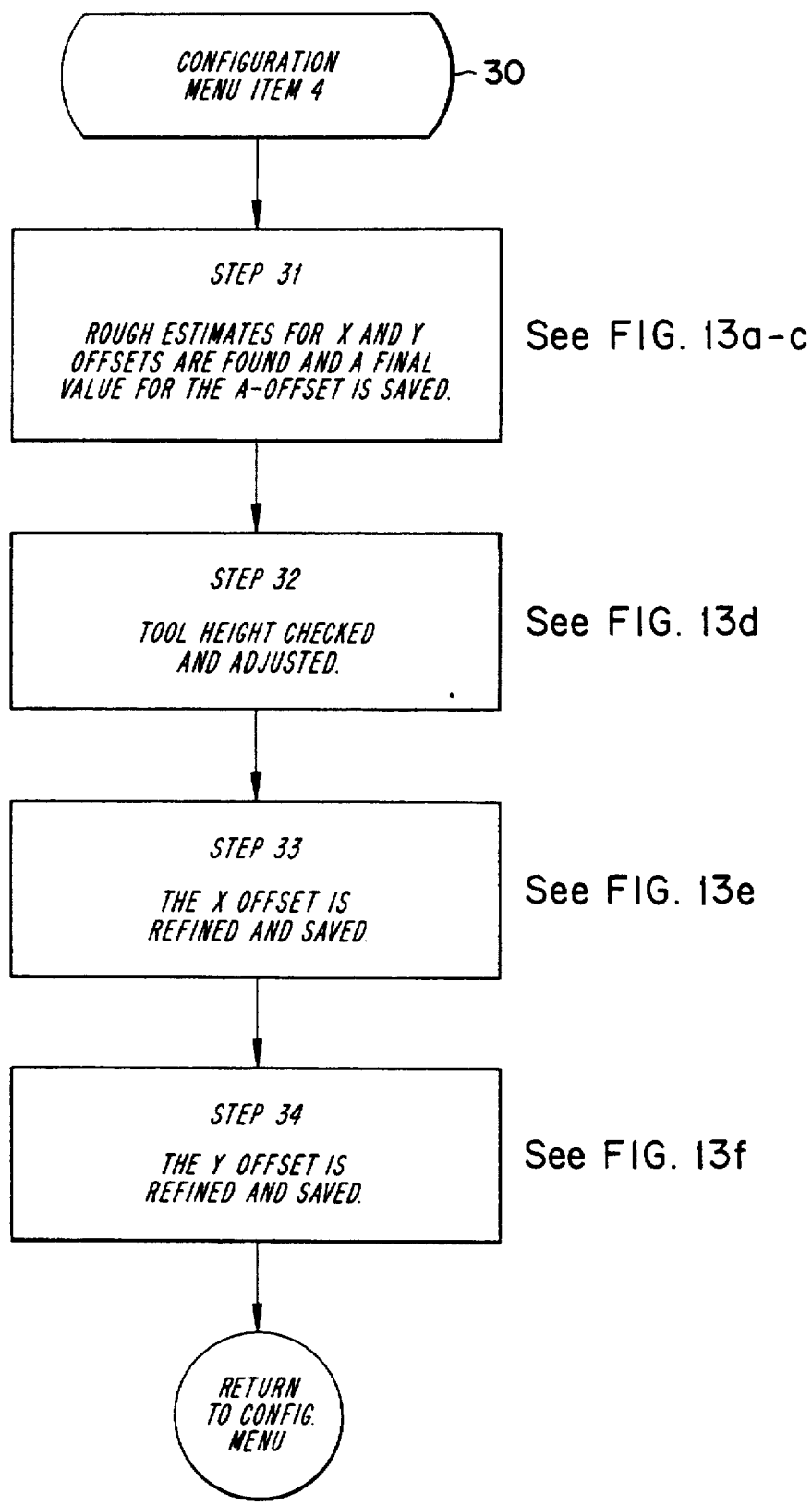
FIGS. 13, 13a, 13b, 13c, 13d, 13e, and 13f are flow charts illustrating individual steps of the tool calibration shown in FIG. 12.

FIG. 13 shows the overall process of calibrating the apparatus to compensate for these offsets. Process begins with an initiation step 30 entered when an operator selects the appropriate item from the configuration menu. At step 31, rough estimates for the X and Y offsets are found and a final value for the A-offset is determined and saved, as more fully described in FIG. 13a. At step 32, the tool height is checked and adjusted as illustrated in greater detail in the flow chart of FIG. 13b. Step 33 involves the refining and saving the X offset, as shown in greater detail in the flow chart of FIG. 13c. In step 34 the Y offset is refined and saved as shown in greater detail in the flow chart of FIG. 13d. After step 34, the program returns to displaying the configuration menu.

Figure 13A:
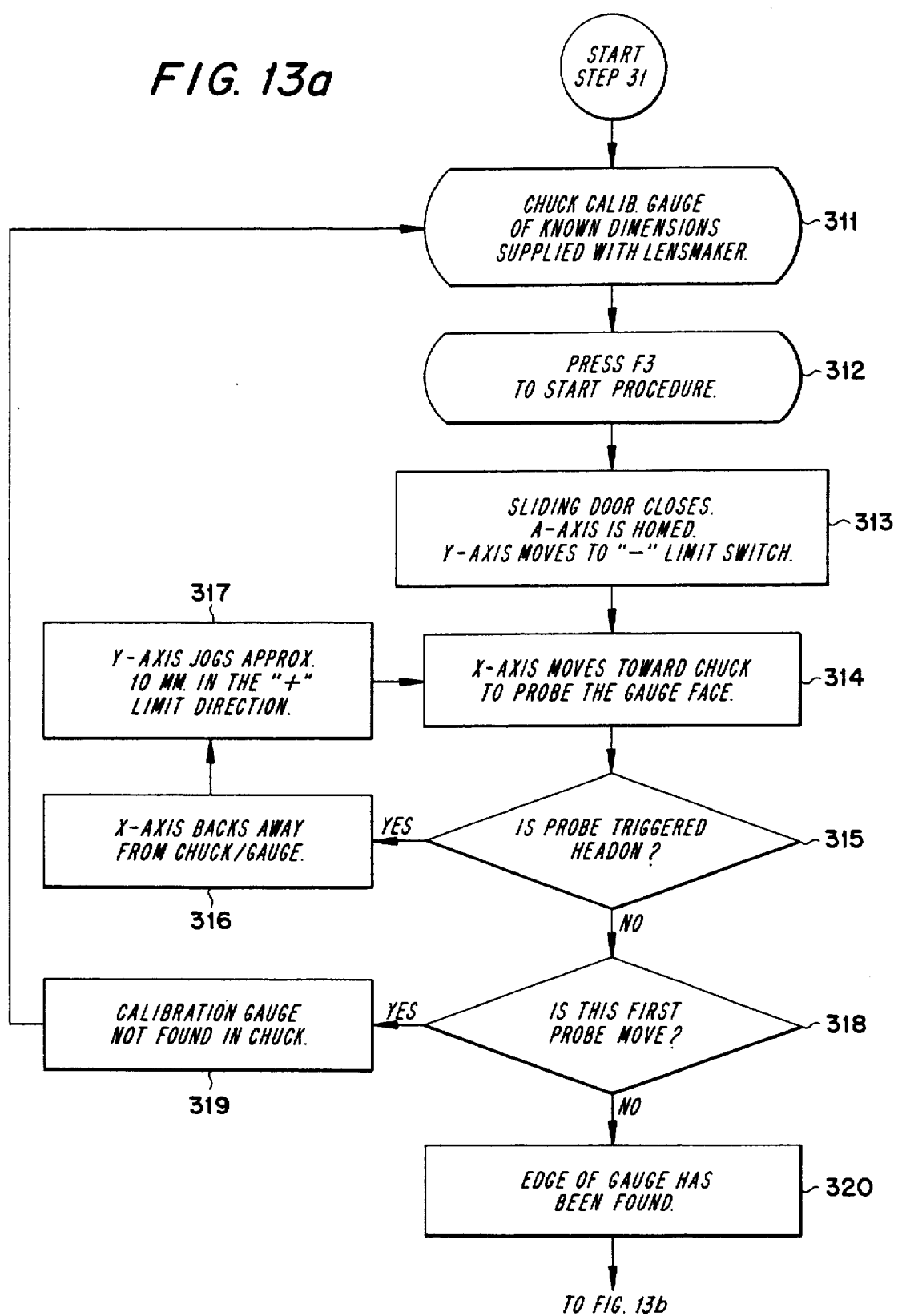

FIG. 13a illustrates in detail the process of obtaining rough estimates for the X and Y offsets and saving a final value for the A-axis offset. The process begins with step 311 wherein the chuck calibration gauge 90 of known dimension is placed into the apparatus. At step 312, the procedure is started by selecting the appropriate, dedicated control function key (e.g., F3) on the keyboard. At step 313, the sliding door closes and the A-axis is brought to a home position. The Y-axis slide 3A moves to the "−" limit switch 27B.

At step 314, the X-axis slide 2 moves towards the chucked gauge 90 to probe its face. At step 315 it is determined whether the probe 80 is triggered head-on. If it is triggered head-on, the X-axis slide 2 backs away from the chuck 23 and the Y-axis slide 3A shifts approximately 10 mm, for example, in the "+" limit direction at step 317, whereupon the process returns to step 314. By this control loop, the edge of the gauge 90 is determined.

Once the probe 80 is not triggered head-on, process proceeds past step 315 to step 318 where it is determined whether this was the initial move of the probe 80. If the probe 80 is not triggered head-on and it is the first move of the probe 80, then it is determined at step 319 that the calibration gauge 90 is not in the chuck 23 and the system returns to step 311 for placement of the calibration gauge 90 into the chuck 23. If it is not the probe's first move, then it is determined at step 320 that the face of the gauge 90 has been found.

Figure 13B:
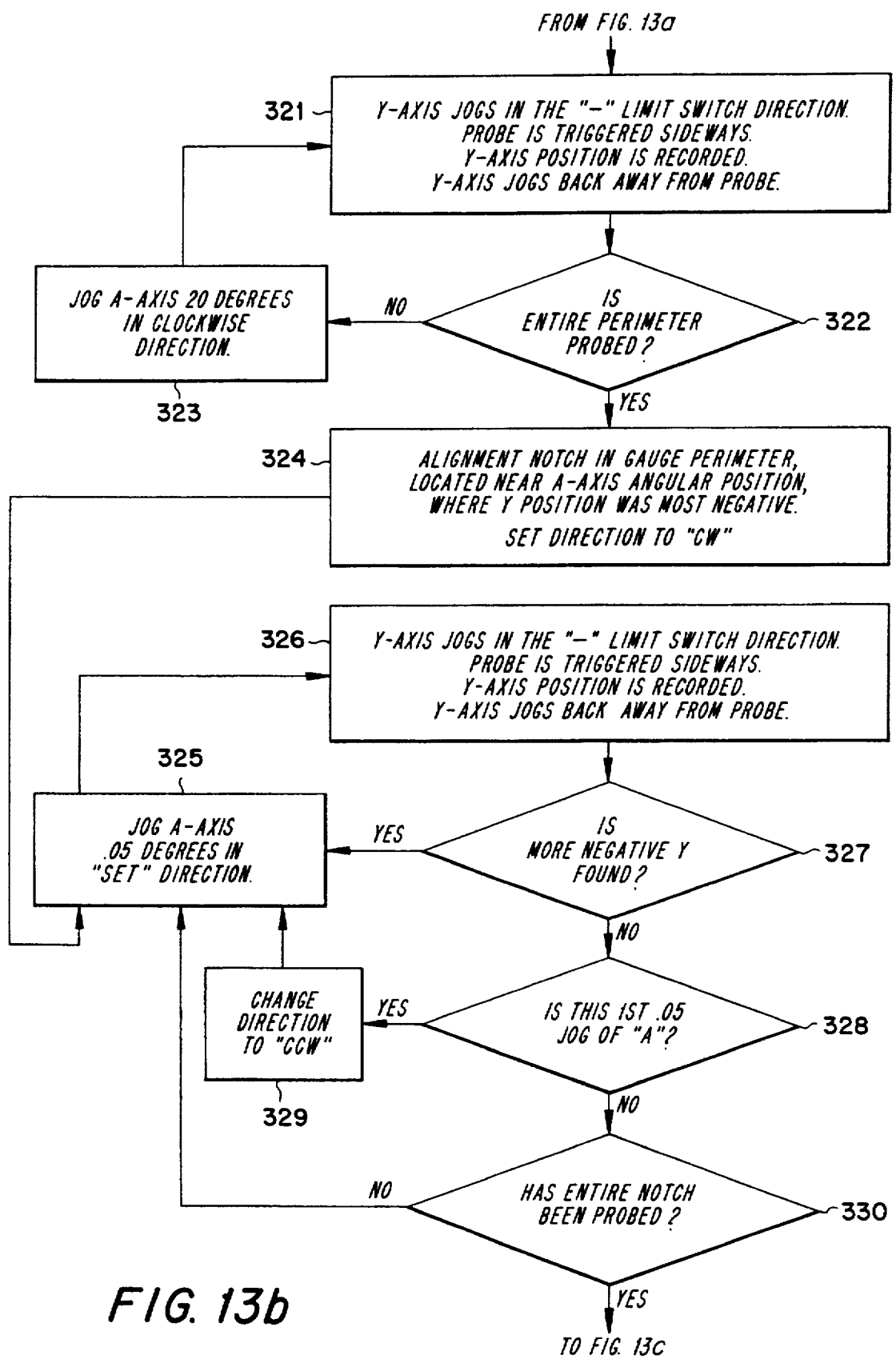
Figure 13C:
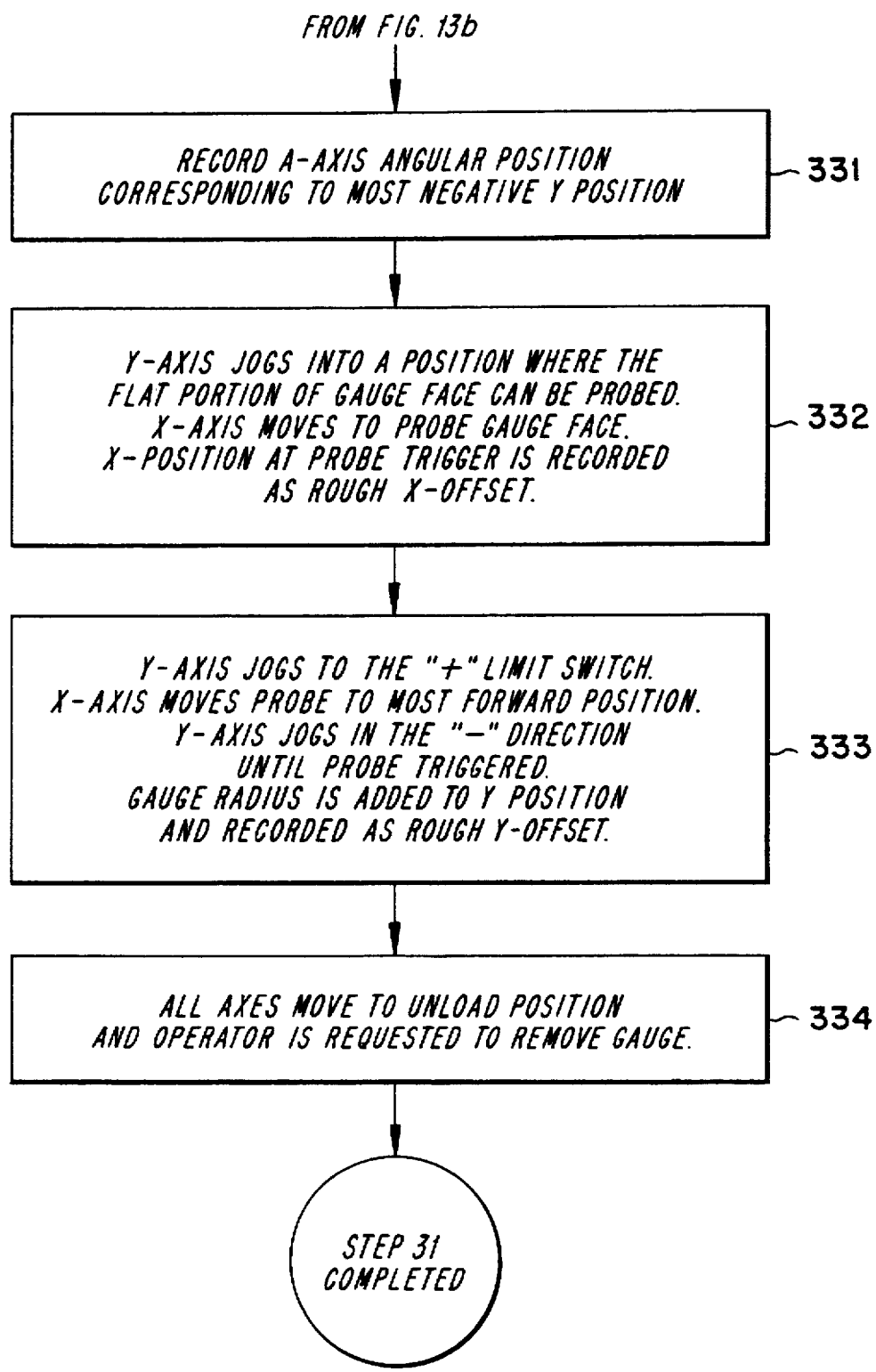

In FIGS. 13b–13c at step 321 the Y-axis slide 3A shifts in the "−" limit switch direction until the probe tip 81 has indicated that its side has engaged an edge of the calibration gauge 90. At this time, the Y-axis position is recorded to indicate the edge position of the gauge 90 and the Y-axis slide 3A backs away the probe 80.

At step 322, it is determined whether the entire perimeter of the gauge 90 has been probed. If not, at step 323 the A-axis is rotated 20° in a set, e.g., clockwise direction and the process returns to step 321 for determining and recording the Y-axis position.

Once this cycle has been completed and the entire perimeter probed, the process goes on to step 324 where the alignment notch 93 in the gauge perimeter is located. This is accomplished by determining the angular position in which the Y-axis slide 3A position was most negative, thereby corresponding to the some portion of the notch 93. This angular position is shifted clockwise at step 325 where the A-axis is rotated 0.05° in the set direction whereupon the process continues to step 326. At step 326, the Y-axis slide 3A moves in the "−" limit switch direction until the probe 80 is triggered when its tip's side engages the gauge 90. The Y-axis position is then recorded and the Y-axis slide 3A backs away the probe 80.

If it is determined that a more negative Y-axis position is found at step 327 the process returns to step 325 whereupon the A-axis is rotated 0.05°. If a more negative Y displacement is not found, the process continues on to step 328 where it is determined whether this is the first 0.05° rotation. If it is the first 0.05° rotation, at step 329 the set direction of rotation is changed, e.g., to counterclockwise, and the routine proceeds to step 325. If, on the other hand, at step 328 it is determined that this is not the first 0.05° rotation, it is then determined in step 330 whether the entire notch 93 has been probed. If the answer is no, then the routine returns to step 325 for further processing.

If the entire notch 93 has been probed as determined at step 330, then at step 331 the A-axis angular position corresponding to the most negative Y position is recorded, thereby establishing the final A-axis offset between the ideal 90 degree position of the indexing pin insertable into the bore 95 of the gauge 90 to a horizonal line perpendicular to the A-axis.

At step 332, the Y-axis slide 3A moves into a position where the flat portion of the gauge face can be probed. The X-axis slide 2 moves to probe the gauge face 92 and the X position when the probe 80 is triggered is recorded as a rough X-axis offset. Thereafter, at step 333, the Y-axis slide 3A moves to the "+" limit switch 27A and the X-axis slide 2 move the probe to its most forward position. A Y-axis slide 3A moves in the "–" direction until the probe 80 is triggered. The gauge radius is added to the Y position and recorded as a rough Y-axis offset. Thereafter, at step 334, all axes move to an unload position and the operator is requested to remove the gauge 90 thereby completing step 32 of the apparatus tool calibration.

Figure 13D:
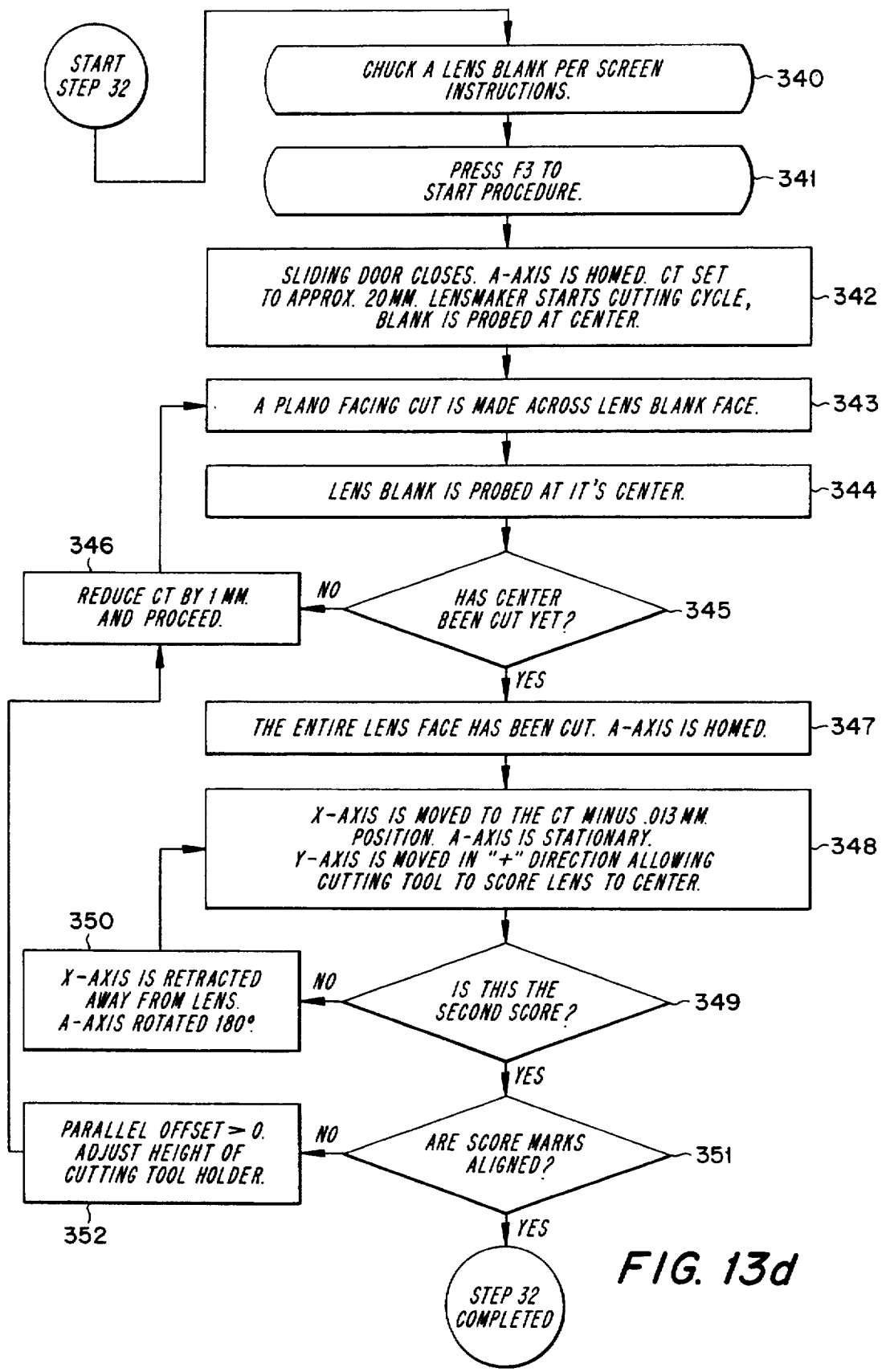
Figure 13E:
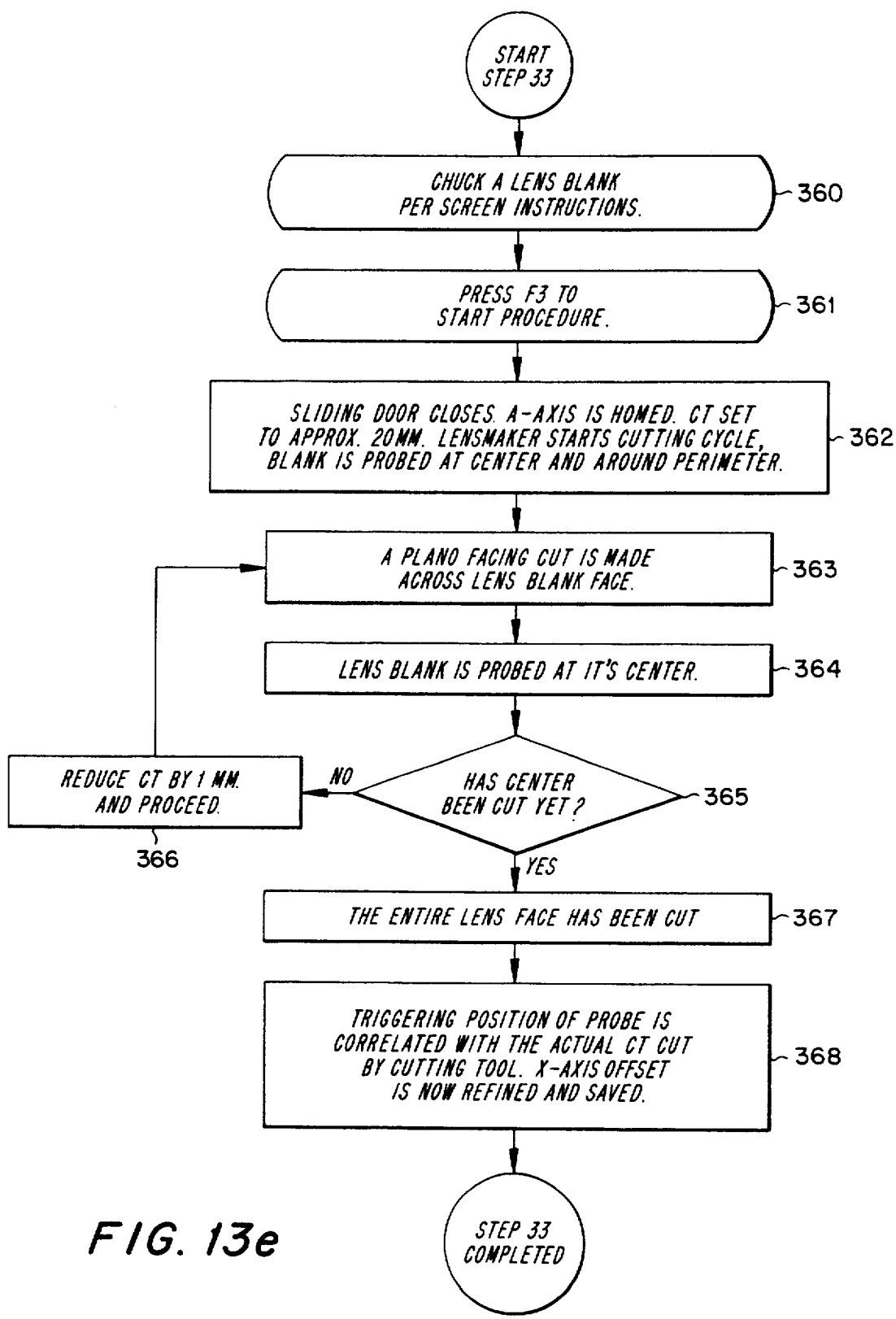

FIGS. 13d–13e illustrates the tool height check and adjustment process. At step 340 a lens blank is placed in the chuck 23 in accordance with instructions appearing on a display screen. At step 341, a dedicated control function key (e.g., F3) is pressed to start the procedure. The process continues to step 342 where the sliding door closes and the A-axis is brought to a home position with center thickness CT set to approximately 20 mm and the apparatus starts a lens cutting cycle by probing the blank at its center. At step 343, a plano face cut is made across the lens blank face.

Thereafter, at step 344, the lens blank is probed by probe 80 at the blank's center. At step 345, it is determined whether the center has been cut. If it has not been cut, the process proceeds to step 346 where in center thickness CT is reduced by 1 mm and process proceeds back to step 343. If the lens blank center has been cut, at step 347, the entire lens face is determined to have been cut and the A-axis is brought to a home position. The blank thus has a plano surface ready for scribing.

Thereafter, at step 348 the X-axis slide 2 is moved to a center thickness CT position of negative 0.013 mm, for example. The A-axis is kept stationary and the Y-axis slide 3A is moved to a "+" direction allowing the cutting tool to score a line from an outer edge to the center of the blank.

The process then continues on to step 349 wherein it is determined whether this is the second score line. If it is not, at step 350 the X-axis is retracted away from the lens blank and the A-axis is rotated 180°, whereupon the process returns to step 348. If it is determined that this is the second score line at step 349, the process proceeds to step 351 where it is determined whether the two score marks, each extending from opposite outer edges to the center of the blank, are aligned.

If the score marks are not aligned, at step 352 it is determined that the parallel offset is greater than zero and the height of the cutting tool holder is adjusted by the operator using the height adjusting mechanism shown in FIG. 7. The routine proceeds back to step 346 where the center thickness CT is reduced by 1 mm and thereafter a plano face cut is performed and new score marks are scribed. If the new score marks are aligned, then it is determined that the cutter tool edge will pass through the center of rotation.

For additional accuracy, this process may be repeated with the X-axis slide 2 in a different position and the lens blank being displaced along the X-axis with the addition of a spacer (not shown). This allows for the determination that, if the cutter tool edge still passes through the center of rotation, the axis of rotation is co-planar with X-axis movement of the cutter tool 20. If the plane of X-axis slide rails 9 is not parallel to the axis of rotation, then the second set of scribe lines would not be aligned. Therefore, by displacing both the lens blank and the cutting tool along the X-axis, two determinations can be made to detect this possible misalignment.

FIG. 13e discloses the process of refining and saving the X-axis offset. The process begins with step 360 wherein the lens blank is placed in the chuck 23, in accordance with the instructions appearing on the display screen. A dedicated function key (e.g., F3) is then pressed to start the procedure at step 361. At step 362, the sliding door closes and the A-axis is brought to a home position. The center thickness CT is set to approximately 20 mm and the apparatus starts a cutting cycle by probing the blank at its center and around its perimeter in a manner similar to the probing procedure shown in the flow chart of FIG. 13a. Thereafter, step 363, a plano surfacing cut is made across the lens blank face. At step 364 the lens blank is probed at its center. It is determined at step 365 whether the center has been cut. If not, the process proceeds to step 366 where center thickness CT is reduced by 1 mm and the process returns to step 363. Once this cycle is completed and the lens blank face center has been cut, the process continues to step 367 where the entire lens face is determined to have been cut.

Thereafter at step 368, the triggering position of the probe 80 is correlated with the actual center thickness CT cut by the cutting tool. The X-axis position is thus refined and saved, completing this routine.

Figure 13F:
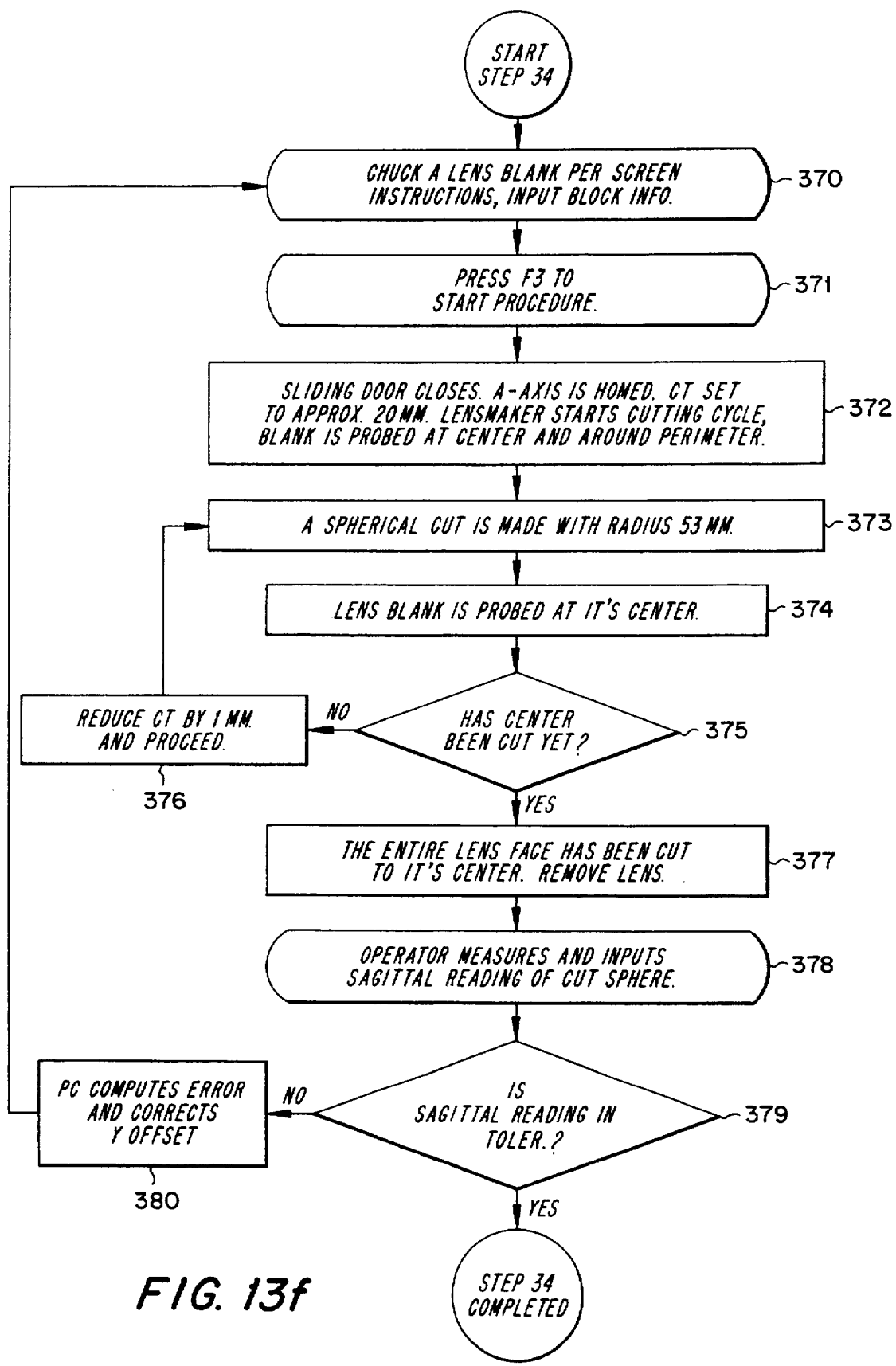

FIG. 13f discloses the process of refining and saving the Y-axis offset. In this process, at step 370 a lens blank is placed in the chuck 23 per instructions appearing on the display screen. Thereafter, at step 371 a dedicated control function key (e.g., F3) is pressed to start the procedure. At step 372 the sliding door closes and the A-axis is brought to a home position. The center thickness CT is set to approximately 20 mm and the apparatus starts a cutting cycle wherein the blank is probed at its center and around its perimeter. Thereafter, at step 373 a spherical cut is made with a radius of 53 mm (roughly a 10 dioptric curve), for example. The lens blank is then probed at its center, as indicated in step 374. At step 375, it is determined whether the center has been cut. If it has not, the process reduces center thickness CT by 1 mm as shown in step 376 and the process proceeds on to step 373. Once the center has been cut, as determined in step 375, the process continues on to step 377 where the entire lens face is determined to have been cut and the lens is removed.

The operator then measures, at step 378, the sagittal reading of the cut lens using, for example, a digital sagittal gauge. The sagittal reading is then input either manually or electronically to the computer 6. If the sagittal reading is not within a tolerance, the computer 6 computes an error and corrects the Y-axis offset at step 380 and the process returns to step 370 where the routine is re-initiated. If the sagittal reading is within a tolerance as determined at step 379, the process is completed. The tolerance range stored in the computer 6 and can be varied by the operator.

The calibration process is thus completed.

9) Cutting Operation

In the actual cutting operation of apparatus, the operator inputs certain required criteria to the digital electronic system 6. This data includes: the type of material to be worked upon, the type of curve required (concave or convex), and the prescription information relating to the curve to be generated. The digital electronic system 6 from this information has, or generates using algorithms, the control data it requires to effect control of the cutting operation.

During the actual cutting operation, the digital electronic system 6 supplies at regular intervals, e.g., every 2 to 4 milliseconds, appropriate drive signals to the motors 11, 16 and 21 controlling the spatial and angular relationship of the blank/work-piece to the apparatus cutter tool 20 so that the required surface shape is generated.

During the cutting of a work-piece formed of a plastically behaving material the following criteria are normally applied to the movement of the apparatus cutter tool 20 and the rotation of the blank/work-piece:

—the rotational velocity of the blank/work-piece is steadily increased (until reaching a maximum rotational velocity or a maximum frequency for the target frequency component) as the apparatus cutter tool approaches the axis of rotation of the blank/work-piece;

—the in-feed rate of the apparatus cutter tool 20 by the second location and movement arrangement or Y-axis slide 3A is adjusted to maintain constant cutter displacement tangential to the surface being formed as explained with reference to FIG. 11; and —the movement (displacement) induced in the apparatus cutter when generating a toric curve in a surface is oscillatory in nature, i.e., contains both positive and negative drive movements in the direction parallel to the axis of rotation of the blank/work-piece.

An apparatus made in accordance with either of the above described embodiments of the present invention can have a number of operational criteria placed upon it. For example, the apparatus may be built/designed to cut:

1) visual lenses only; or
2) laps-plastic lap tools only; or
3) laps-aluminum lap tools only; or
4) lap tools, plastic or aluminum; or
5) visual lenses and lap tools (aluminum or plastic).

The actual operational criteria placed on the apparatus, although it will not have a drastic effect on the basic conceptual design of the apparatus, will have a very marked effect on the performance criteria of the apparatus and the actual equipment used therein.

Further, it should be noted that the cycle time can also be optimized for a given set of maximum cutting depth criteria in a given apparatus by adjusting the number of passes of the cutter over the surface of lens or lap tool used to generate the surface thereon. Unlike the prior art, in which the individual passes follow the ultimate surface profile curve desired, the present invention calculates in real time intermediate curves between the curve of the blank (initially and after each pass) and the surface profile ultimately desired. Thus, each pass of the cutter removes a relatively uniform amount of material during the entire pass, whereas the prior art might initially remove a large amount of material part of the pass, but not engage the material at all at other portions of the pass thereby creating unnecessary stresses on the material and apparatus.

Figure 14A:
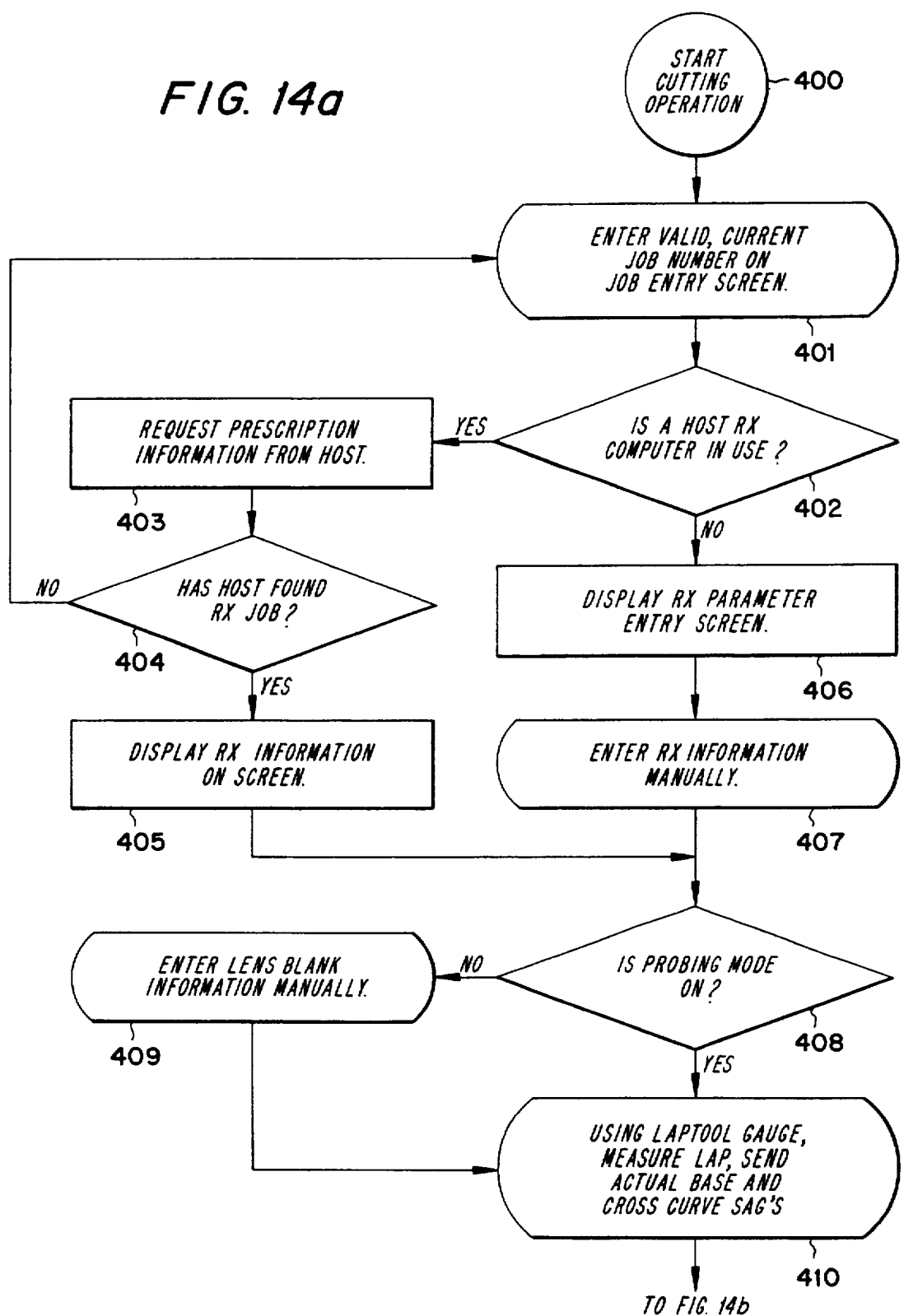
FIG. 14a–c form is a flow chart illustrating a cutting operation in accordance with the present invention.
Figure 14B:
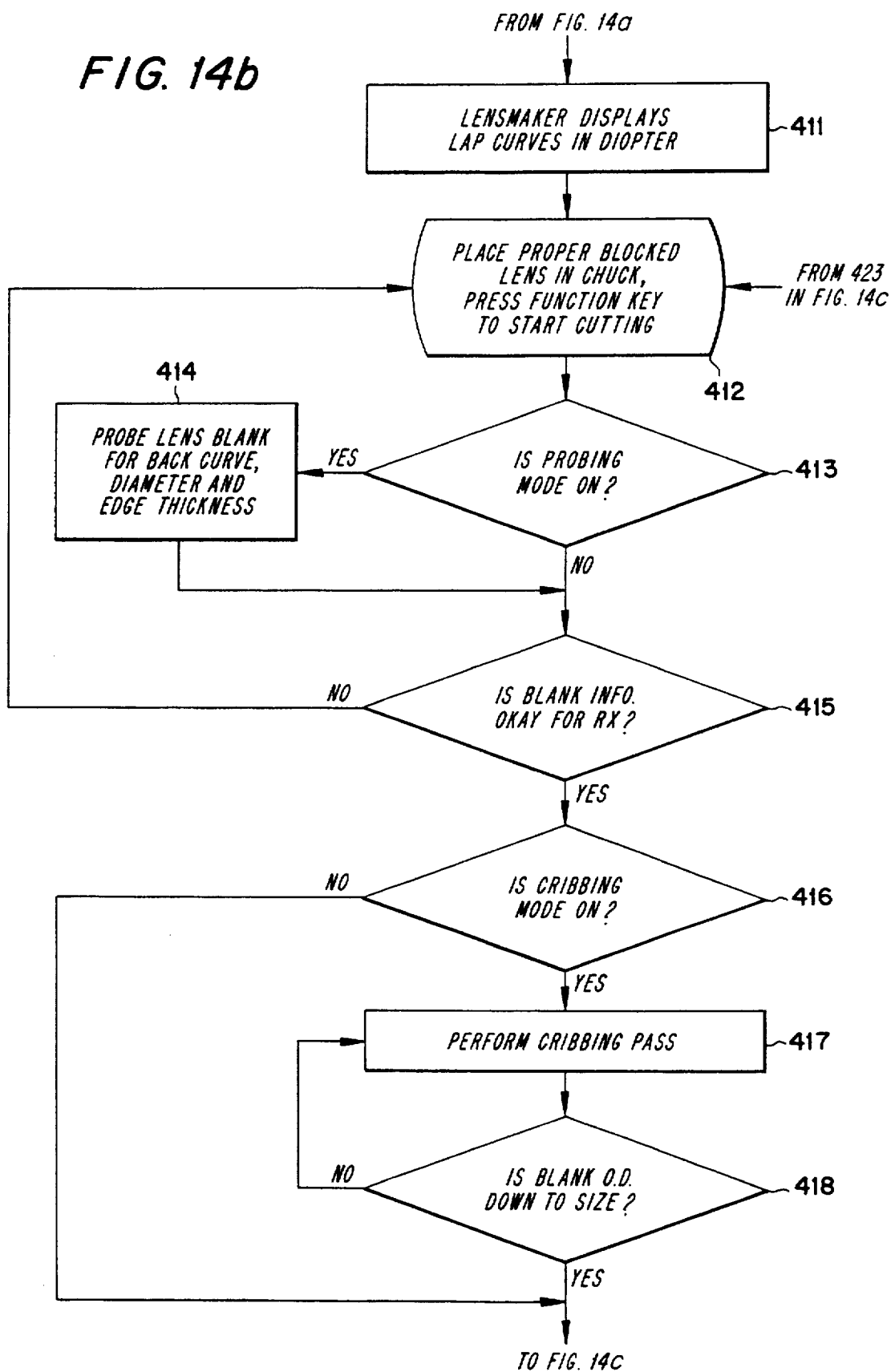
Figure 14C:
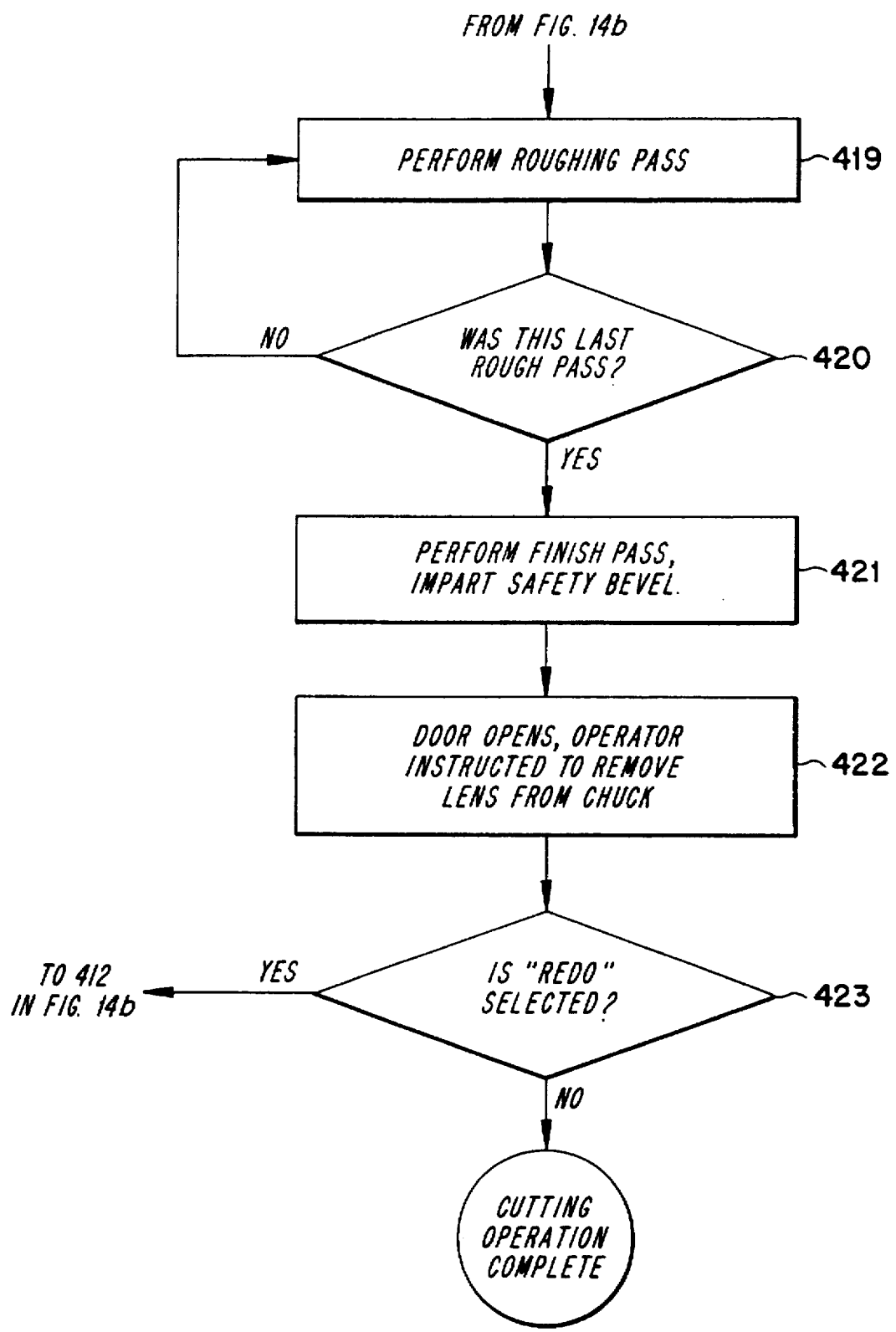

FIG. 14a and 14b form is a flow chart of the lens cutting operation. This process begins at step 400 where the operation is initialized. At step 401, the current job number is entered through the keyboard in accordance with a prompt appearing on the screen. Alternatively, the job number can be entered by way of a bar code and bar code reader (not shown).

At step 402 it is determined whether a host computer is in use. If it is in use, the apparatus requests prescription information corresponding to the job number from the host and at step 404 it is determined whether the host computer has found the prescription job. If it has not, the operator is asked to reenter the current job number at step 401.

If the host computer has found the prescription job at step 404 then the process continues to step 405 where the prescription information is displayed on the screen and the process continues to step 408 described below. However, if a host computer is not in use, at step 406, the screen displays a prescription parameter entry screen and the prescription information is manually inputted at step 407.

Either way the prescription information is entered, at step 408, it is determined whether the apparatus is in the probe mode. If it is not in the probe mode, at step 409 the lens blank information is manually inputted. However, if the probe mode is determined to be on at step 408, at step 410 the lens is measured using a lap tool gauge and the actual base and cross curve sagittal parameters are inputted. Thereafter, at step 411 the apparatus displays the lap curve diopter.

At step 412 the lens blank is placed properly in the chuck 23 and a function key is pressed to start the cutting process. At step 413, it is determined whether the probe mode is on. If it is on, then the lens blank is probed for curve, diameter, edge thickness (while the blank rotates) and center thickness at step 413. Once these dimensional parameters are determined or when the probe mode is not on, the process continues to step 415 where it is determined whether the blank is acceptable for the prescription. If it is not, an appropriate message is displayed and the process returns to step 412. If the blank is acceptable for the prescription, lens blank data is displayed and the apparatus is ready to begin its first cutting operation. The process continues on to step 416 where it is determined whether a cribbing mode is on.

If the cribbing mode is not on, the process skips ahead to step 419, described below. If the cribbing mode is on, then at step 417 a cribbing pass is performed to reduce the outside dimension of the blank, thereby reducing the amount of surface cutting required.

At step 418, it is determined whether the outside dimension of the blank is down to size. If it is not, the cribbing pass is performed again. If the blank is down to size, the process continues on to step 419 where a roughing pass is performed. The roughing pass includes calculating the curvature the lens then has for comparison the curvature ultimately desired, and calculating an intermediate curve. The cutter tool 20 is then moved to cut the intermediate curve. Several roughing passes can be performed, each pass cutting a distinct surface somewhere between the probed surface and the desired, final surface.

Each of the encoders 21, 24 and 25 provide the computer 6 with the position of the X-, Y- slides 2, 3A and A-axis. With this information, the computer 6 calculates the amount of movement necessary to position the cutter tool 20 at a point on the intermediate curve it has calculated. The computer 6 then issues individual control signals to the X-axis slide 2, the Y-axis slide 3A and the rotational control 11. The individual control signals are not dependent on each other. Each of the control signals are individually generated in a proactive manner, rather than any one control having to react to the position of the other two axial positions, such as required in the Logan et al patent.

At step 420, it is determined whether the roughing pass of step 419 was the last pass. If it was not, the process returns to step 419 until the last roughing pass has been completed.

Thereafter, the process continues on to step 421 where the finishing pass is performed and a safety bevel is imparted on the edge portion of the lens. The safety bevel smooths the surface created near the rim of the lens by cutting a small radius in the lens surface at the rim of the lens, which smoothly blends the surface created on the face of the lens with the edge surface of the lens. Thereafter, at step 422, the door opens and the operator is instructed to remove the lens from the chuck 23.

At step 423 it is determined whether the operator has selected to "redo" the lens cutting operation, in which case the process returns to step 412 and the cycle repeated. If the "redo" is not selected, then the cutting operation is complete.

10) Speed Control

With regard to certain materials, in particular plastically behaving materials such as thermoplastics and metals, in order to effect a clean and effective cut of the blank surface, the instantaneous surface speed of the blank relative to the cutter tool has to be maintained above a surface speed threshold value. However, with regard to materials such as thermo-setting plastics like CR-39 (a registered trademark of PPG Industries) which do not melt, and glass which is an amorphous material with a high melting point, this threshold surface speed is not so critical because it is quite low. More significantly, variations in the surface speed throughout the cut are quite tolerable. Also, when the cutter tool approaches the axis of rotation of the blank, the instantaneous surface speed of the blank relative to the cutter tool diminishes.

The net effect of these two factors with regard to plastically behaving materials means that at some point on the surface of the blank the instantaneous surface velocity may fall below the threshold value; and more importantly, a minimum cycle time will not be achieved when the surface speed is held constant. In order to eliminate or reduce the problems this will cause, several courses of action may be adopted, such as:

1) Rotate the blank at a very high velocity at all times. This will require a highly expensive and heavy motor. Further, the higher the speed of operation, the more responsive and controllable the apparatus has to be in all other operations to prevent error in the surface generated.

2) Use a rotary tool, such as a milling tool. This requires an additional motor, and (as discussed above) the quality of the finish provided is far less directly usable, leading to the definite requirement of further and longer manufacturing procedures.

3) Vary the surface speed at which the surface is cut, as a function of the amount of displacement of the cutter tool from the axis of rotation.

In a preferred embodiment of the present invention, the surface speed of the blank is varied with respect to the displacement of the cutter tool from the axis of rotation of the blank.

The above adopted preferred embodiment of the present invention has the distinct advantages that:

1) the accuracy of the generation operation can be maintained;

2) the quality of the finished cut surface on plastically behaving materials can be maintained so that the generated surface is more directly usable; and 3) the cycle time for generating a lens is reduced.

The actual quality of the surface finish generated by the apparatus is dependent in part upon the in-feed rate of the cut on the surface of the blank. To counterbalance the advantages of a usable cut surface, it also has to be taken into account that the slower the cutter in-feed rate the longer is the time required for the generation of the surface by the apparatus. Consequently, a reasonable balance has to be achieved so that the generation of the surface is relatively quick, and the quality of the surface is sufficiently good so as to minimize subsequent down-line operations. The present invention relates the in-feed rate to the surface profile to achieve the proper balance between the quality of the cut surface and the speed of generation of the surface. In particular, the present invention adjusts the in-feed rate to the instantaneous slope of the surface profile. The in-feed rate is held constant in a direction tangential to the surface, as opposed to maintaining a constant in-feed in a direction perpendicular to the rotational axis, as in the prior art. For a complex surface profile, the present invention instantaneously adjusts the in-feed rate on a constant basis.

Figure 11:
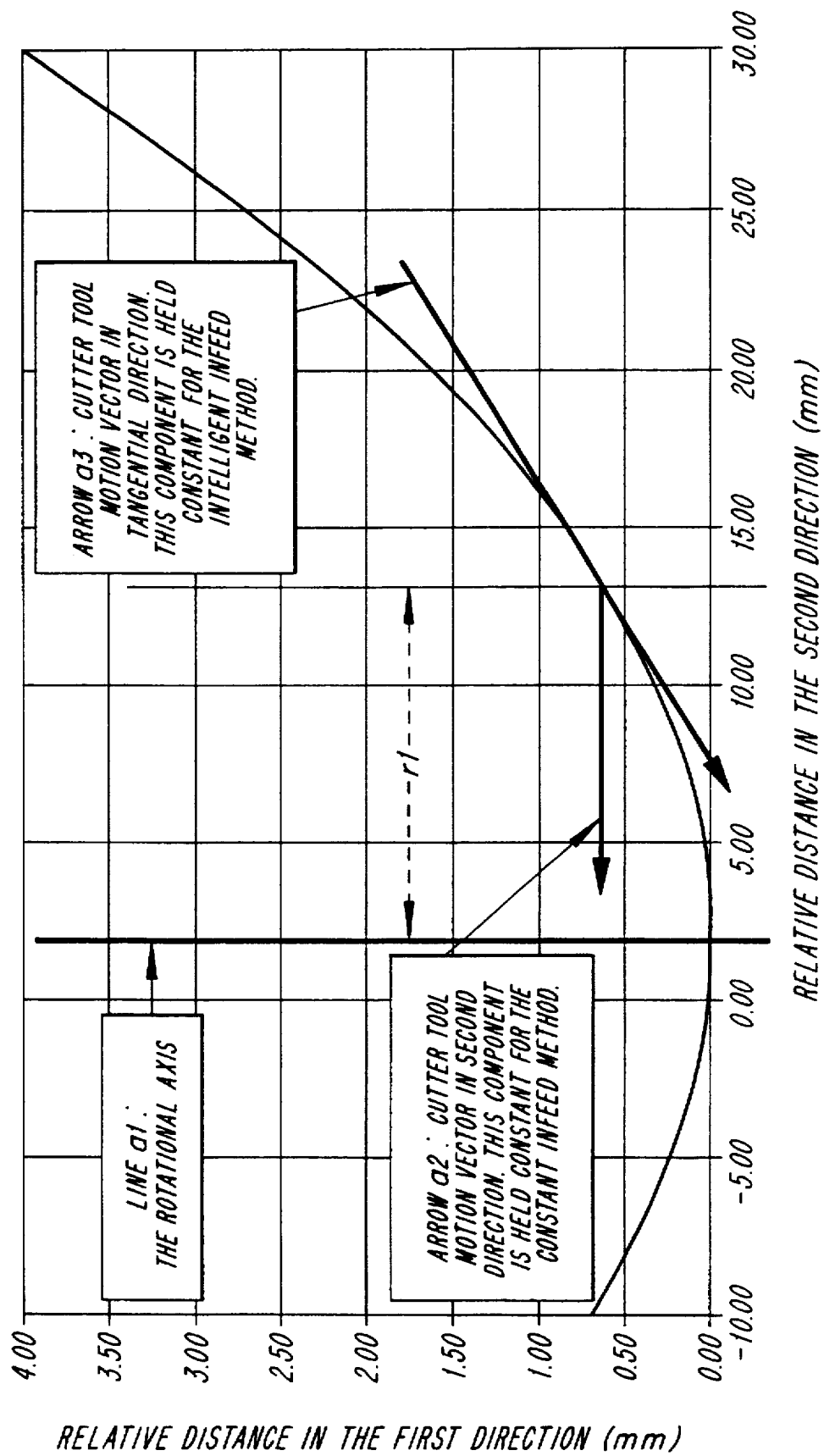
FIG. 11 is a graph illustrating cutter tool motion vectors for constant in-feed and for variable in-feed methods in accordance with the present invention.

FIG. 11 illustrates cutter tool motion vectors for constant in-feed method and for intelligent in-feed method according to the present invention by showing a graph of the relative distance in the first direction (X-axis) against the relative distance in a second direction (Y-axis). The curved line appearing in the graph corresponds to the profile of a cross-section of the lens surface. Line A1 corresponds to the rotational axis of the lens in the chuck 23. Line A2 corresponds to the cutter tool motion vector in a second direction (Y-axis). This component is held constant for the constant in-feed method.

Line A3 corresponds the cutter tool motion vector in a tangential direction. This component is held constant for the intelligent in-feed method. Line A3 indicates that as the cutter is moved from an outside surface inward, the speed of the cutter tool corresponds to the instantaneous slope of the lens surface at any given point. In other words, the X and Y components of the tangential cutter tool motion vector (the value of which is maintained constant) change as the cutter tool progresses along the curve of the lens. For instance, for the lens illustrated, at the outside periphery of the lens the cutter tool proceeds towards the rotational axis relatively slowly and along the axis of rotation relatively quickly when compared to the movements of the cutter tool in the X and Y directions adjacent the rotational axis. At the rotational axis, the cutter tool displacement in the Y-axis direction is relatively fast while the cutter tool displacement in the X-axis direction is nearly non-existent. The digital electronic means 6 varies the rate of displacement of the cutter tool 20 in the Y-axis (second direction) with respect to the steepest tangential at a given distance from the rotational axis.

This in-feed method can be used on rotationally asymmetric surfaces which have varying tangential directions as the blank rotates.

This complex mechanism assures that the cutter tools cuts at an optimal rate, measured in feet per second, for example.

As a general guideline, as will be well appreciated by those skilled in the art, the quality of the surface finish of a lap tool does not have to be as high as with a visual lens. Therefore, a greater in-feed rate, and consequently, a faster cycle time, can be utilized with the lathing of lap tools.

11) Time Optimization

Normally, the blank/work-piece is generated or worked upon from the outside inward towards the center of the blank/work-piece, i.e., towards the axis of rotation of the blank/work-piece. Now, assuming a constant angular velocity for the blank/work-piece as the apparatus cutter tool 20 approaches the axis of rotation, the relative surface speed of the portion of the blank/work-piece engaged by the apparatus cutter tool 20 diminishes.

This does not pose a problem when cutting certain materials, such as thermosetting materials. However, in order to effect a clean and useful cut of the blank/work-piece when cutting a plastically behaving material such as polycarbonate or aluminum, the relative speed of the blank/work-piece to the apparatus cutter tool 20 has to be maintained above a threshold value; thus, it is clear that problems may arise.

To maintain sufficient surface speed, shorten the cycle time, and improve the surface finish, the surface speed is varied during the cutting operation. The speed of rotation of the spindle 22 may be increased as the apparatus cutter tool 20 approaches the axis of rotation.

One of the principle benefits of the invention is that it is capable of quickly producing surfaces of superior accuracy and surface finish. This efficient use of time is referred to as "cycle time optimization" herein. The cycle time optimization in accordance with the present invention is achieved by controlling the rotational speed of the motor 21 such that the induced oscillatory motion in the X-axis is as aggressive as is possible according to the accuracy requirements of the specific application and the motion capabilities of the tool and the X-axis slide 2.

The time required to produce a given surface is inversely proportional to the rotational speeds at which the motor 21 is operated during the cutting of a given surface. In the prior art, lathe operations maintain a constant surface speed throughout the cutting process (with the exception of cutting near the axis of rotation where the constant rotational speeds are usually employed). (The surface speed may be defined as the speed of the cutter tool relative to the portion of the work-piece which is in cutting engagement with the cutter tool.) A constant surface speed is normally obtained by varying the rotational speed of the rotational means as an inverse proportion to the distance of the portion of the work-piece which is in cutting engagement with the cutter tool from the rotational axis. Although a constant surface speed may be desirable in many applications, the present invention allows for variations in surface speed to accommodate various work-piece materials and applications.

When the constraint of constant surface speed is removed from the process of determining rotational speed of the motor 21 in accordance with the present invention, it becomes possible to optimize cycle times by operating the motor 21 at higher rotational speeds than are possible when maintaining a constant surface speed. Instead of constraining the apparatus to a constant surface speed, rotational speeds are constrained by the accuracy requirements of the application (e.g., generation of a lens), the motion capabilities of the X-axis slide 2, and the capabilities of the motor 21.

If the surface to be produced is a rotationally symmetric surface, the rotational speeds of the rotational drive means are constrained by the accuracy requirements of the application and the motion capabilities of the motor 21. If the surface to be produced is a rotationally asymmetric surface, the rotational speeds of the motor 21 are constrained by the accuracy requirements of the application and the motion capabilities of the X-axis slide 2.

In the case of a rotationally symmetric surface, the rotational speeds of the motor 21 were held substantially constant and substantially equal to a maximum rotational speed implied by the accuracy requirements of a given surface and the speed capabilities of the motor 21. This maximum rotational speed is usually substantially equal to the maximum rotational speed achieved when cutting the over the rotational axis if the given surface were produced according to a constant surface speed method.

The present invention is advantageous over the prior art method in part because it distinguishes a rotationally symmetric surface from a rotational asymmetric surface and produces cutting motions in which the rotational speeds of the motor 21 are subject to different cycle time optimizing constraints.

In the case of a rotationally asymmetric surface, the rotational speeds of the motor 21 are constrained by the accuracy requirements of the surface to be produced and the maximum speed of the X-axis slide 2, the maximum oscillation frequency and the maximum acceleration of the X-axis slide 2. The maximum frequency and the maximum acceleration of the X-axis slide 2 are dependent on the accuracy requirements of the rotational asymmetric surface. These values are determined using Fourier transforms of the oscillatory motion.

Figure 15:
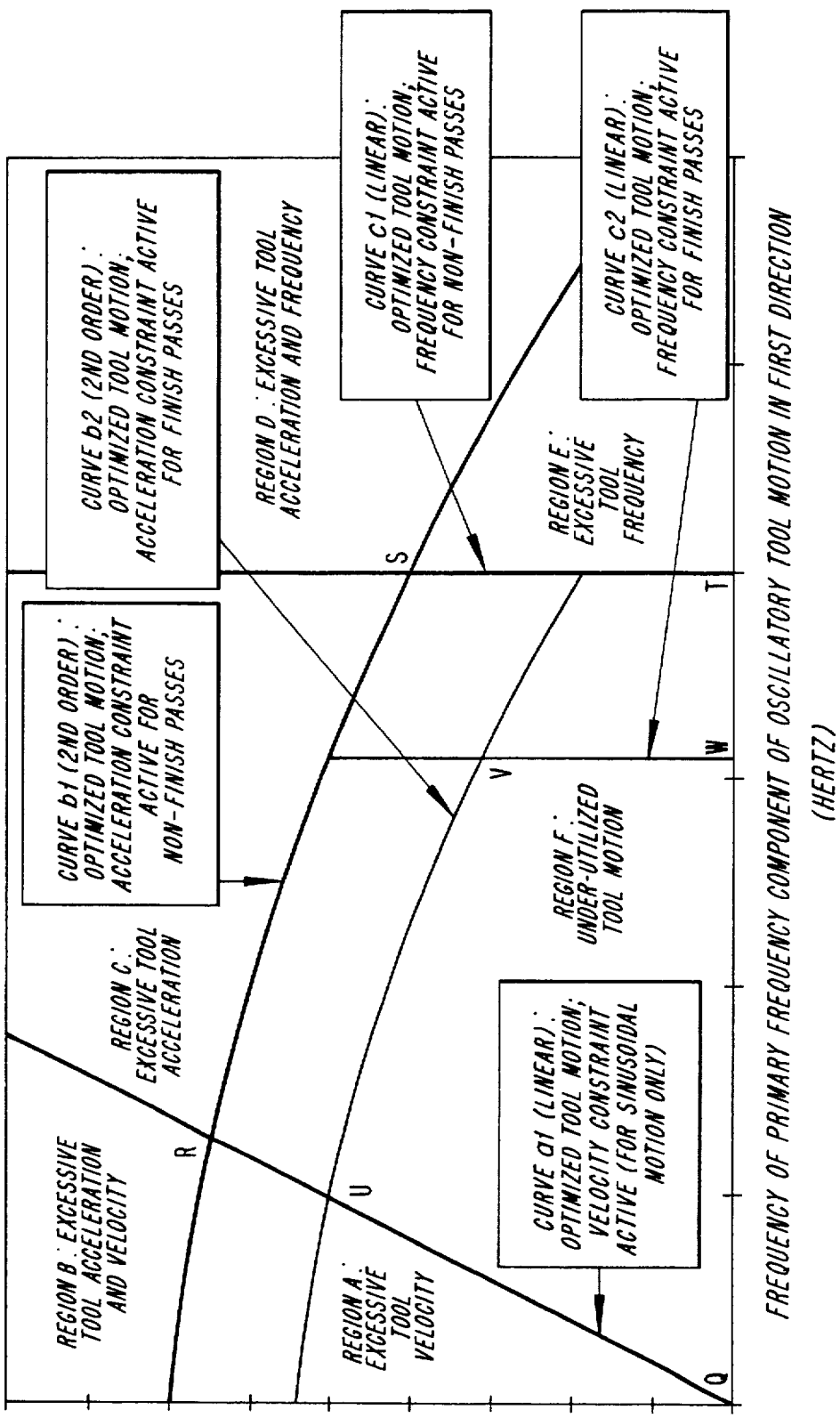
FIG. 15 is a graph of cycle time optimization curves implied by oscillatory tool motion in a first direction in accordance with the present invention.

FIG. 15 is a graph of cycle time optimization curves implied by constraints of the oscillatory tool motion in a first (X-axis) direction. The graph correlates the maximum tool acceleration due to oscillatory tool motion in the first direction against the primary frequency component of the oscillatory tool motion in the first direction. In other words, the primary frequency component of the oscillatory tool motion influences the ranges of acceleration for the tool motion. The graph defines several regions where the tool motion is not ideal and several curves where the tool motion is optimized.

Curve a1 is a graph of the maximum velocity criteria when only sinusoidal tool motion occurs. This curve does not define the maximum velocity curve for non-sinusoidal tool oscillation in the first direction because transforming the maximum velocity criteria into an acceleration versus target component frequency graph is dependent on the shape of a given surface to be cut and is only linear on the acceleration versus target component frequency graph in the case of pure sinusoidal motion.

Curve b1 relates the optimized tool motion for non-finish passes. Curve b2 represents the optimized tool motion for finish passes. Curve c1 represents the frequency constraint for non-finish passes whereas curve c2 is the optimized tool motion frequency constraint for finish passes.

The cycle time optimization process may be considered graphically to be the process of finding a point on the boundary of the closed curve QRST (for non-finished passes) or of finding a point on the boundary of the closed curve QUVW (for finished passes) for every instant of time during the cutting operation required to produce the given rotationally asymmetric surface. Outside the closed curve QRST (for non-finished surfaces) and outside of the closed curve QUVW (for finished passes) tool oscillatory motion is either beyond the capabilities of the machine or is unable to meet the accuracy requirements of this surface.

Within the closed curve QRST (for non-finished passes) and with a closed curve QUVW (for finished passes) tool oscillatory motion is under utilized and the cycle time is not optimized.

These closed curves QRST and QUVW define several regions such as Region A where excessive tool velocity becomes a problem. In Region B, the excessive tool acceleration and velocity both become problems. In Region C, excessive tool acceleration is apparent and in Region D, excessive tool acceleration and frequency both become apparent. Within Region E, excessive tool frequency poses a limitation. Within Region F, the tool motion is acceptable but under-utilized.

For every time T during the cutting operation required to produce a given rotationally asymmetric surface, there is only one point on the closed curves QRST and QUVW which could accurately describe the maximum acceleration and the frequency of the target frequency component when the distance from the rotational access of the rotational drive means to the point of cutting engagement of the tool and the work-piece is to occur is given by a function R(T).

Various sinusoidal oscillations of different amplitudes correspond to distinct curves.

These values are stored in the computer 6 so that the tool motion is optimized at all times by following the curves representing the optimized values for motion and frequency of the tool in the first direction (x axis).

The digital electronic means 6 thus maintains constant the rate of displacement of said cutter tool in the Y-axis direction with respect to the angular displacement of the blank, and varies the displacement of the cutter tool 20 in the X-axis direction in accordance with the particular shape being generated in the surface of the blank. If a rotationally symmetric shape is being generated in the surface of said blank, then a maximum rotational speed of the motor 21 is not exceeded. If a rotationally asymmetric shape is being generated in the surface of the blank, then a maximum speed, a maximum acceleration, and a maximum acceleration of the X-axis slide 2 are not be exceeded. The maximum rotational speed, maximum speed, and maximum acceleration are dependent on the accuracy requirements for said shape being generated in the surface of said blank. The maximum acceleration is dependent on a predetermined target frequency component of said oscillatory cutter tool motion in the first direction. The maximum acceleration is a second degree polynomial in a variable x, said variable x representing the frequency of said target frequency component and the maximum frequency is dependent on the accuracy requirements for the shape being generated in the surface of the blank.

EXAMPLE 1:

The above-mentioned design and general configuration of an apparatus when adapted for use in the generation of lap tools, including the generation of aluminum laps, is provided with a motor 21 which rotates the blank/work-piece at a speed in the range of 75 to 100 revolutions per minute.

Further, in this particular application the actual quality of the cut surface is not of absolute criticality and the rate of rotation of the blank/work-piece may be maintained constant for the movement of the apparatus cutter tool 20 along the second axis.

EXAMPLE 2:

The above-mentioned design and general configuration of an apparatus when adapted for use in the generation of visual lenses, such as plastic lenses made from CR-39™ or polycarbonate or any suitable high index plastic, is provided with a motor 21 whose rate of rotation of the blank/work-piece is at a speed in the order of 50 to 3000 revolutions per minute dependent upon the position of the apparatus cutter tool 20 relative to the axis of rotation of the blank/work-piece.

Thus, mostly in order to reduce cycle time and still be able to cut the edges well, the variation in rotational velocity is a function of:

a) cylinder power, b) prism, c) decentration, d) other surface parameters that intensify the rotationally asymmetric nature of the surface to be produced. The actual degree of variation in the rate of rotation of the blank/work-piece as the apparatus cutter tool 20 moves along the second axis towards the axis of rotation of the blank/work-piece depends on the type of surface being cut, for example:

a) a toric surface cut
—from 50 rpm at the edge
—to 800 rpm at the center b) a non-rotational symmetric aspheric lens cut
from 50 rpm at the edge
to 800 rpm at the center c) a spheric or rotationally symmetric aspheric lens cut at a constant 3000 rpm.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A method of operating an apparatus for generating ophthalmic products from blanks, comprising the steps of:

rotating a blank about an axis of rotation, said blank having a surface through which said axis extends;

effecting relative movement between said cutter tool and the blank in a first direction oriented parallel to said axis of rotation of the blank for cutting a desired configuration onto said surface of the blank;

effecting relative movement between said cutter tool and the blank in a second direction oriented transverse to said first direction; and supplying signals from a digital electronic means for controlling the angular displacement of the blank with respect to a reference plane containing the blank and for controlling the relative movement between the cutter tool and the blank in said first and second directions, whereby the relative movements between said cutter tool and said blank in said first and second directions and the angular displacement of the blank about said axis of rotation are all proactively controlled independently of one another without any one of said relative movements and said angular displacement being dependent on a different movement or angular displacement of the cutter tool or the blank, by means of control signals supplied at regular time intervals.

2. A method according to claim 1, comprising the further step of inducing an oscillatory type of motion in said relative movement between said cutter tool and said blank in said first direction to generate a complex surface shape into the surface of said blank.

3. A method according to claim 1, comprising the further step of maintaining constant the rate of relative movement between said cutter tool and said blank in said second direction with respect to the angular displacement of said blank and varying said relative movement between said cutter tool and said blank in said first direction in accordance with the particular shape being generated in the surface of said blank, such that, if a rotationally symmetric shape is being generated in the surface of said blank then a maximum rotational speed of said rotating means is not exceeded, and if a rotationally asymmetric shape is being generated in the surface of said blank, then a maximum speed, a maximum acceleration, and a maximum acceleration of said first moving means in said first direction is not to be exceeded;

wherein said maximum rotational speed, said maximum speed, and said maximum acceleration are dependent on the accuracy requirements for said shape being generated in the surface of said blank; and wherein said maximum acceleration is dependent on a predetermined target frequency component of said oscillatory cutter tool motion in said first direction; and wherein said maximum acceleration is a second degree polynomial in a variable x, said variable x representing the frequency of said target frequency component; and wherein said maximum frequency is dependent on the accuracy requirements for said shape being generated in the surface of said blank.

4. A method according to claim 1, comprising the further step of varying the rate of relative movement between said cutter tool and said blank in said second direction with respect to the angular displacement of said blank.

5. A method according to claim 1, comprising the further step of varying the rate of movement between said cutter tool and said blank in said second direction with respect to said angular displacement of said blank as a function of the steepest tangential at a given distance from the rotational axis.

6. A method according to claim 1, comprising the further step of varying the rate of angular displacement of said blank proportionately with respect to said angular displacement of said blank as a function of the instantaneous slope of the surface configuration.

7. A method according to claim 1, comprising the further step of limiting movement of said cutter tool to two directions being oriented transversely to one another.

8. A method according to claim 1, comprising the further steps of:

detecting a position of said cutter tool in said first and second directions and the angular displacement of said blank with respect to a reference plane containing said blank; and calculating an amount of movement necessary to position said cutter tool at a point, wherein said signal supplying step includes providing individual control signals to first moving means, second moving means and rotating means for controlling the movement of said cutter tool along said first and second directions and said angular position of said blank in accordance with said calculated amount of movement.

9. An apparatus according to claim 1, further comprising:

position detecting means for detecting a position of said cutter tool in said first and second directions and said angular displacement of said blank with respect to a reference plane containing said blank, wherein said digital electronic means calculates an amount of movement necessary to position said cutter tool at a point and provides individual control signals to first moving means, second moving means and rotating means for controlling the movement of said cutter tool along said first and second directions and the angular position of said blank in accordance with said calculated amount of movement.

10. An apparatus for generating surface configurations in blanks, comprising:

rotating means for rotating a blank about an axis of rotation;

a cutter tool for cutting a desired surface configuration onto the rotating blank;

first moving means for effecting relative movement between said cutter tool and the blank in a first direction oriented parallel to said axis of rotation of the blank;

second moving means for effecting relative movement between said cutter tool and the blank in a second direction oriented transversely to said first direction; and digital electronic means connected to said rotating means and to said first and second moving means for supplying control signals controlling the angular displacement of the blank with respect to a reference plane containing the blank and controlling the relative movement between the cutter tool and the blank along said first and second directions, such that the relative movements between said cutter tool and said blank along said first and second directions and the angular displacement of the blank about said axis of rotation are all proactively controlled independently of one another without any one of said relative movements and said angular displacement being dependent on a different movement or angular displacement of the cutter tool or the blank, by means of control signals supplied at regular time intervals.

11. An apparatus according to claim 10, wherein said first and second directions are oriented perpendicular with respect to one another.

12. An apparatus according to claim 10, wherein said digital electronic means induces an oscillatory type of motion in the relative movement between said cutter tool and said blank in said first direction to generate a complex surface shape into the surface of the blank.

13. An apparatus according to claim 1, wherein said digital electronic means maintains constant the rate of relative movement between said cutter tool and said blank in said second direction with respect to the angular displacement of the blank and varies the relative movement between the cutter tool and said blank in said first direction in accordance with the particular shape being generated in the surface of the blank, such that, if a rotationally symmetric shape is being generated in the surface of said blank then a maximum rotational speed of the rotating means is not exceeded, and if a rotationally asymmetric shape is being generated in the surface of said blank, then a maximum speed, a maximum acceleration, and a maximum acceleration of the first moving means in the first direction is not be exceeded;

wherein said maximum rotational speed, said maximum speed, and said maximum acceleration are dependent on the accuracy requirements for said shape being generated in the surface of said blank; and wherein said maximum acceleration is dependent on a predetermined target frequency component of said oscillatory cutter tool motion in the first direction: and wherein said maximum acceleration is a second degree polynomial in a variable x, said variable x representing the frequency of said target frequency component; and wherein said maximum frequency is dependent on the accuracy requirements for said shape being generated in the surface of said blank.

14. An apparatus according to claim 1, wherein said digital electronic means constitutes means for varying the rate of relative movement between said cutter tool and said blank in said second direction with respect to the angular displacement of said blank.

15. An apparatus according to claim 10, wherein said digital electronic means varies the rate of relative movement between the cutter tool and said blank in the second direction with respect to the angular displacement of said blank as a function of the steepest tangential at a given distance from the rotational axis.

16. An apparatus according to claim 10, wherein said digital electronic means varies the rate of angular displacement of the blank proportionately with respect to the angular displacement of said blank as a function of the instantaneous slope of the surface configuration.

17. An apparatus according to claim 10, wherein each of said first and second moving means comprises:

two parallel disposed rails on a first body and two parallel disposed guides on a second body, which rail and guides interact with each other to limit movement of said cutter tool to two directions being oriented transversely to one another; and a drive shaft mounted on the first body driven by a motor to provide the drive and locating force for the second body.

18. An apparatus according to claim 17, wherein the drive shaft is a screw threaded drive shaft.

19. An apparatus according to claim 17, wherein the apparatus includes a main support base and said first moving means is mounted upon said support base, which support base constitutes said first body of said first moving means, and said second body of said first moving means comprises a block located on said first body; and said second moving means is mounted on said block, which block constitutes said first body of said second moving means and the second body of said second moving means comprises a carrier of said cutter tool.

20. An apparatus according to claim 10, wherein said cutter tool provides a point cutting contact with the blank.

21. An apparatus according to claim 20, wherein the cutter tool is a diamond tipped cutter tool.

* * * * *